US012663499B2

(12) United States Patent
Adachi

(10) Patent No.: US 12,663,499 B2
(45) Date of Patent: Jun. 23, 2026

(54) SIMULATION DEVICE, RECEPTION DEVICE, SIMULATION METHOD, ARRANGEMENT METHOD, AND PROGRAM

(71) Applicant: Sinumy Corporation, Osaka (JP)

(72) Inventor: Yasuhiko Adachi, Osaka (JP)

(73) Assignee: Sinumy Corporation, Osaka (JP)

( * ) Notice: Subject to any disclaimer, the term of this patent is extended or adjusted under 35 U.S.C. 154(b) by 267 days.

(21) Appl. No.: 18/557,272

(22) PCT Filed: Apr. 26, 2022

(86) PCT No.: PCT/JP2022/018827
§ 371 (c)(1),
(2) Date: Oct. 25, 2023

(87) PCT Pub. No.: WO2022/230852
PCT Pub. Date: Nov. 3, 2022

(65) Prior Publication Data
US 2024/0210518 A1      Jun. 27, 2024

(30) Foreign Application Priority Data
Apr. 28, 2021    (JP) ................................. 2021-075938

(51) Int. Cl.
*G01S 5/14*          (2006.01)
*G01S 5/02*          (2010.01)
(52) U.S. Cl.
CPC .............. *G01S 5/14* (2013.01); *G01S 5/0215* (2013.01); *G01S 5/0218* (2020.05)

(58) Field of Classification Search
CPC ......... G01S 5/14; G01S 5/0218; G01S 5/0215
USPC ......................................................... 342/458
See application file for complete search history.

(56) References Cited

U.S. PATENT DOCUMENTS

| | | | |
|---|---|---|---|
| 9,646,298 B2 | 5/2017 | Corbalis et al. | |
| 10,064,008 B2 | 8/2018 | Park et al. | |
| 10,448,207 B2 | 10/2019 | Park et al. | |
| 2006/0268961 A1 | 11/2006 | Prestwich et al. | |
| 2007/0127422 A1 | 6/2007 | Belcea | |

(Continued)

FOREIGN PATENT DOCUMENTS

| | | | | |
|---|---|---|---|---|
| CN | 106291461 B | * | 1/2019 | .............. G01S 11/06 |
| EP | 1184236 B1 | | 10/2006 | |

(Continued)

OTHER PUBLICATIONS

International Search Report (English translation) dated Jul. 12, 2022, from corresponding International Application No. PCT/JP2022/018827.

*Primary Examiner* — Harry K Liu
(74) *Attorney, Agent, or Firm* — Troutman Pepper Locke LLP

(57) ABSTRACT
A method for arranging receiving unit sets and improving the interference resistance thereof is provided. An arranging method includes: a step of arranging a first receiving unit set including one or more first receiving units that receive a positioning signal transmitted from a terminal device, at a first position; a step of arranging a second receiving unit set including one or more second receiving units that receive the positioning signal, at a second position; and a step of arranging shielding members for changing a propagation distance of the positioning signal.

8 Claims, 15 Drawing Sheets

(56)                    References Cited

U.S. PATENT DOCUMENTS

2008/0051103 A1    2/2008   Goren et al.
2014/0323163 A1   10/2014   Venkatraman et al.
2019/0257917 A1    8/2019   Nishimura

FOREIGN PATENT DOCUMENTS

| EP | 2551695 | A1 | 1/2013 |
|----|---------|----|--------|
| JP | 2003150883 | A | 5/2003 |
| JP | 2005109700 | A | 4/2005 |
| JP | 2006524454 | A | 10/2006 |
| JP | 3886955 | B2 | 2/2007 |
| JP | 2007538265 | A | 12/2007 |
| JP | 2008546284 | A | 12/2008 |
| JP | 2009517988 | A | 4/2009 |
| JP | 2009264747 | A | 11/2009 |
| JP | 4468416 | B2 | 5/2010 |
| JP | 2010109913 | A | 5/2010 |
| JP | 2010147519 | A | 7/2010 |
| JP | 2010257381 | A | 11/2010 |
| JP | 4854699 | B2 | 1/2012 |
| JP | 5034935 | B2 | 9/2012 |
| JP | 2014154923 | A | 8/2014 |
| JP | 2014206496 | A | 10/2014 |
| JP | 2015010838 | A | 1/2015 |
| JP | 5710922 | B2 | 4/2015 |
| JP | 5858305 | B1 | 2/2016 |
| JP | 2016526152 | A | 9/2016 |
| JP | 6031104 | B2 | 11/2016 |
| JP | 6146155 | B2 | 6/2017 |
| JP | 2017181137 | A | 10/2017 |
| JP | 6322905 | B2 | 5/2018 |
| JP | 2019077085 | A | 5/2019 |
| JP | 6551615 | B2 | 7/2019 |
| JP | 2020026998 | A | 2/2020 |
| JP | 2020094978 | A | 6/2020 |
| JP | 2020169899 | A | 10/2020 |
| JP | 2020184776 | A | 11/2020 |
| JP | 2020191656 | A | 11/2020 |
| JP | 6812955 | B2 | 1/2021 |
| JP | 6836223 | B2 | 3/2021 |
| JP | 6893316 | B2 | 6/2021 |
| JP | 2021092578 | A | 6/2021 |
| JP | 2021099298 | A | 7/2021 |
| JP | 2021519440 | A | 8/2021 |
| JP | 2021519528 | A | 8/2021 |
| JP | 2021131264 | A | 9/2021 |
| JP | 2021165748 | A | 10/2021 |
| JP | 2021180512 | A | 11/2021 |
| WO | 2004095584 | A1 | 11/2004 |
| WO | 2007021071 | A1 | 2/2007 |
| WO | 2018100892 | A1 | 6/2018 |
| WO | 2018112224 | A1 | 6/2018 |
| WO | 2019183053 | A1 | 9/2019 |
| WO | 2019190377 | A1 | 10/2019 |
| WO | 2020080314 | A1 | 4/2020 |
| WO | 2020085025 | A1 | 4/2020 |

* cited by examiner

Distance between near-side receiving unit set and terminal device(cm)

Distance between near-side receiving unit set and terminal device(cm)

SIMULATION DEVICE, RECEPTION DEVICE, SIMULATION METHOD, ARRANGEMENT METHOD, AND PROGRAM

CROSS REFERENCE TO RELATED APPLICATIONS

This is a U.S. National Phase Application under 35 U.S.C. § 371 of International Patent Application No. PCT/JP2022/018827, filed Apr. 26, 2022, which claims priority of Japanese Patent Application No. 2021-075938, filed Apr. 28, 2021, each of which is hereby incorporated by reference in its entirety.

FIELD OF THE INVENTION

The present invention relates to a simulation apparatus, a receiving apparatus, a simulation method, an arranging method, and a program.

BACKGROUND

Conventionally, positions of terminal devices such as smartphones have been identified while suppressing a deterioration in the position measurement accuracy due to temporal variations in the transmission and reception sensitivity of the terminal devices and receivers by receiving a positioning signal transmitted from the terminal devices at two or more positions (see Japanese Publication No. WO 2020/080314, for example).

In free space where reflections of a positioning signal do not occur, the position of a terminal device can be identified with high accuracy by receiving a positioning signal at two or more positions as described above. On the other hand, in real space, a positioning signal transmitted from a terminal device may be reflected by floors, walls, ceilings, and the like and received. Such multipath can then cause interference in the received positioning signal, and the interference can degrade the accuracy of the position of the terminal device. For example, even though a terminal device is far from a receiver, the terminal device may be determined as being near the receiver because linear waves and reflected waves of the positioning signal strengthen each other.

Furthermore, in the case of receiving a positioning signal at two positions to identify the position of the terminal device that transmitted the positioning signal, the position can be identified with higher accuracy if the two receiving positions are away from each other. However, in real space, an ideal arrangement of the receivers may not be feasible due to constraints caused by objects already in place, wiring restrictions, and other factors.

The present invention was made in view of these circumstances, and it is an object thereof to make it possible to acquire the range in which the position of a terminal device can be identified, while taking into account interference caused by multipath of a positioning signal. It is another object thereof to realize more accurate identification of the position of a terminal device, with a more compact configuration.

SUMMARY

In order to realize at least one of the above-mentioned objects, an aspect of the present invention is directed to an arranging method including: a step of arranging a first receiving unit set including one or more first receiving units that receive a positioning signal transmitted from a terminal device whose position is to be identified, at a first position; a step of arranging a second receiving unit set including one or more second receiving units that receive the positioning signal, at a second position that is different from the first position; and a step of arranging a shielding member for changing a propagation distance of the positioning signal such that a received strength of the positioning signal that is received by the first and second receiving unit sets matches a received strength of the positioning signal that is received by the first and second receiving unit sets in a case in which the first and second receiving unit sets are arranged in real space apart from each other by a predetermined distance that is longer than a distance between the first position and the second position.

By utilizing this configuration, it is possible to receive a positioning signal as if the first and second receiving unit sets were arranged apart from each other by the predetermined distance, in spite of the first and second receiving unit sets being arranged apart from each other by a distance that is shorter than the predetermined distance. Accordingly, it is possible to realize more accurate identification of the position of the terminal device, with a more compact arrangement.

In order to realize at least one of the above-mentioned objects, an aspect of the present invention is directed to a simulation method including: a step of accepting a distance parameter indicating a distance in real space between a first position and a second position that is different from the first position, with respect to identification of a position of a terminal device whose position is to be identified based on a strength difference of a positioning signal that is transmitted from the terminal device and that is received by each of a first receiving unit set arranged at the first position and including one or more first receiving units and a second receiving unit set arranged at the second position and including one or more second receiving units; and a step of acquiring, using the distance parameter, a relationship between the strength difference and smallest and largest values of a distance from the position of the terminal device to the first position, the distance being identifiable using the positioning signal, while taking into account interference caused by multipath of the positioning signal.

By utilizing this configuration, it is possible to acquire a relationship between the range in which the position of the terminal device can be identified and the strength difference, while taking into account interference caused by multipath of the positioning signal. For example, it is possible to determine a distance parameter in a receiving apparatus that identifies the position of the terminal device, by using this result.

Furthermore, an aspect of the present invention is directed to a simulation apparatus including: an accepting unit that accepts a distance parameter indicating a distance in real space between a first position and a second position that is different from the first position, with respect to identification of a position of a terminal device whose position is to be identified based on a strength difference of a positioning signal that is transmitted from the terminal device and that is received by each of a first receiving unit set arranged at the first position and including one or more first receiving units and a second receiving unit set arranged at the second position and including one or more second receiving units; and an acquiring unit that acquires, using the distance parameter, a relationship between the strength difference and smallest and largest values of a distance from the position of the terminal device to the first position, the distance being identifiable using the positioning signal, while taking into account interference caused by multipath of the positioning signal.

By utilizing this configuration, for example, it is possible to determine a distance parameter in a receiving apparatus that identifies the position of the terminal device.

Furthermore, an aspect of the present invention is directed to a receiving apparatus including: a planar shielding member for changing a propagation distance of a positioning signal transmitted from a terminal device whose position is to be identified; a first receiving unit set arranged on the side of a first face of the planar shielding member and including one or more first receiving units that receive the positioning signal; and a second receiving unit set arranged on the side of a second face that is different from the first face of the planar shielding member and including one or more second receiving units that receive the positioning signal.

By utilizing this configuration, the position of the terminal device is identified using a strength difference of a positioning signal that is received by each of the first and second receiving unit sets, and thus it is possible to realize more accurate identification of the position of the terminal device, with a more compact arrangement of the first and second receiving unit sets. It is also possible to identify which side of the planar shielding member the terminal device is located on.

Furthermore, an aspect of the present invention may be directed to the receiving apparatus further including: a first shielding member arranged so as to surround the first receiving unit set; and a second shielding member arranged so as to surround the second receiving unit set, wherein the first and second shielding members each have an opening portion.

By utilizing this configuration, it is also possible to adjust the received strength at the first and second receiving unit sets so as to be consistent with the predetermined distance parameter, by using the first and second shielding members.

Furthermore, an aspect of the present invention may be directed to the receiving apparatus, wherein the first receiving unit set and the second receiving unit set are arranged at different positions in a plane direction of the planar shielding member.

By utilizing this configuration, for example, it is possible to realize more accurate identification of the position of the terminal device.

Furthermore, an aspect of the present invention may be directed to the receiving apparatus further including an identifying unit for identifying the position of the terminal device based on a strength difference of the positioning signal received by each of the first receiving unit set and the second receiving unit set.

With the arranging method and the receiving apparatus according to an aspect of the present invention, it is possible to realize more accurate identification of the position of a terminal device, with a more compact configuration. With the simulation apparatus, the simulation method, and the program according to an aspect of the present invention, it is possible to acquire a relationship between a strength difference of a positioning signal that is received by each of the first and second receiving unit sets and a range in which the position of a terminal device can be identified, while taking into account interference caused by multipath of the positioning signal.

DETAILED DESCRIPTION

Figure 1:
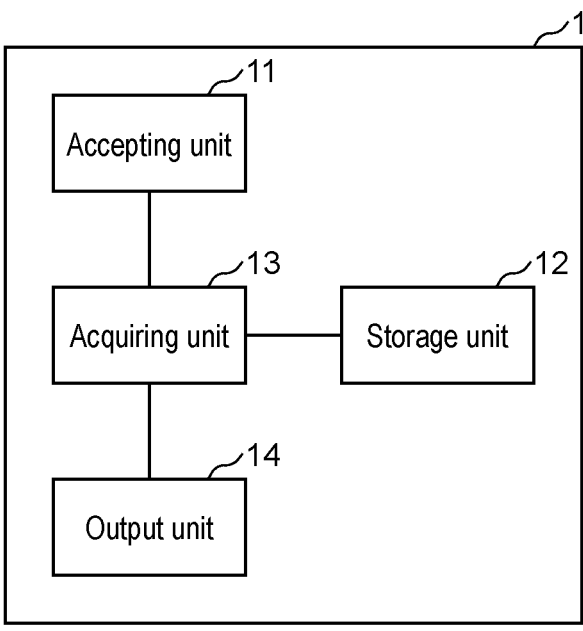
FIG. 1 is a block diagram showing the configuration of a simulation apparatus according to an embodiment of the present invention.

Hereinafter, a simulation apparatus, a receiving apparatus, a simulation method, an arranging method, and a program according to the present invention will be described by way of an embodiment. The constituent elements and steps denoted by the same reference numerals in the embodiment described in the following embodiment are similar or corresponding constituent elements and steps, and thus a description thereof may not be repeated. The simulation apparatus and the simulation method according to this embodiment acquire a relationship between the strength difference of a positioning signal that is received by each of the first and second receiving unit sets and the range of a distance from the position of the terminal device to the position of the receiving unit set, the distance being identifiable using the positioning signal. The arranging method and the receiving apparatus according to this embodiment can identify the position of the terminal device with the same accuracy as when the first and second receiving unit sets are arranged further apart from each other, in spite of the first and second receiving unit sets being arranged more compactly.

FIG. 1 is a block diagram showing the configuration of a simulation apparatus 1. The simulation apparatus 1 includes an accepting unit 11, a storage unit 12, an acquiring unit 13, and an output unit 14.

Figure 3:
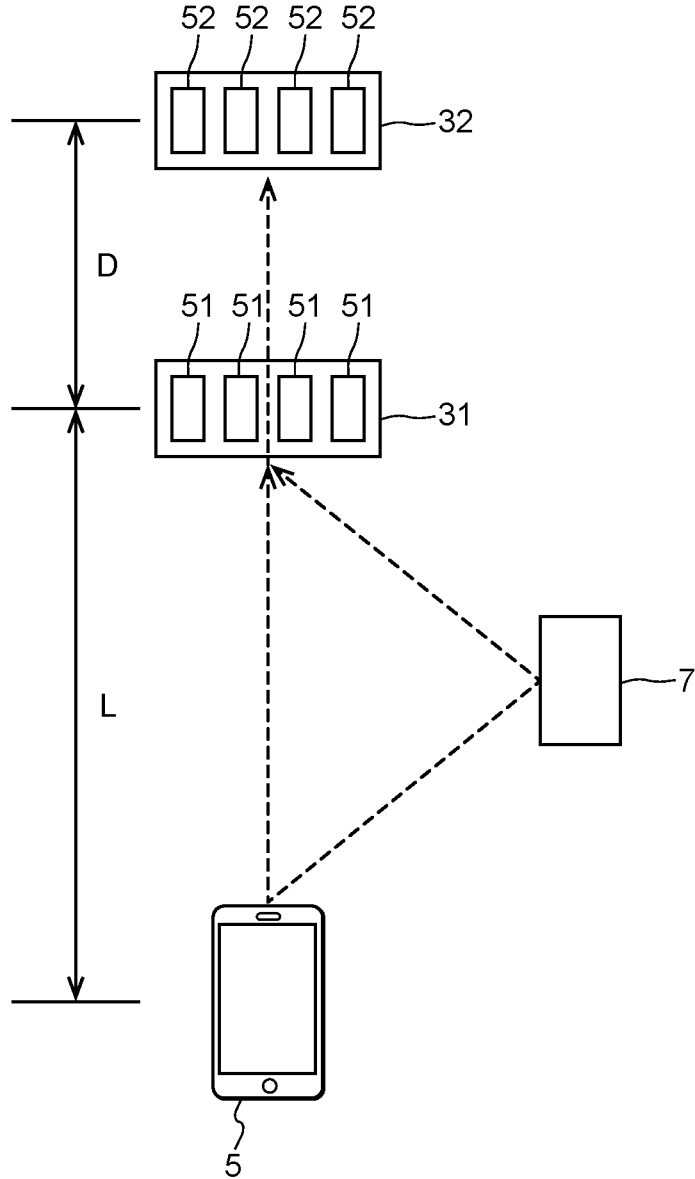
FIG. 3 is a diagram showing an example of an arrangement of first and second receiving unit sets according to the embodiment.

First, a first receiving unit set 31 and a second receiving unit set 32 that receive a positioning signal transmitted from a terminal device 5 whose position is to be identified will be described with reference to FIG. 3. The first and second receiving unit sets 31 and 32 receive the positioning signal in order to identify the position of the terminal device 5. In FIG. 3, the first receiving unit set 31 includes one or more first receiving units 51 and is arranged at a first position. The second receiving unit set 32 includes one or more second receiving units 52 and is arranged at a second position. The first position and the second position are different positions. From the viewpoint of realizing more accurate identification of the position of the terminal device 5, the first receiving unit set 31 preferably includes multiple first receiving units 51, and the second receiving unit set 32 preferably includes multiple second receiving units 52. As shown in FIG. 3, for example, the first receiving unit set 31 may include four first receiving units 51, and the second receiving unit set 32 may include four second receiving units 52, but the number of receiving units included in each of the first and second receiving unit sets 31 and 32 may be one to three, or five or more. The receiving units 51 and 52 included in the first and second receiving unit sets 31 and 32 can acquire the radio wave strength of the positioning signal.

The terminal device 5 that transmits the positioning signal may be, for example, a portable information terminal with communication functions, such as a smartphone, a tablet terminal, a PDA (Personal Digital Assistant), a laptop computer, a transceiver, or other device dedicated to transmitting a positioning signal. In this embodiment, a case will be mainly described in which the terminal device 5 is a smartphone.

If the first receiving unit set 31 includes multiple first receiving units 51, the first position may be, for example, the position of the center of gravity of the multiple first receiving units 51. More specifically, the positions of the centers of gravity of the first receiving units 51 may be identified, and the position of the center of gravity of the identified positions of the multiple centers of gravity may be taken as the first position. The same applies to the second position of the second receiving unit set 32.

The positioning signal may be, for example, pulse waves transmitted intermittently or continuous waves transmitted continuously. More specifically, the positioning signal may be a signal transmitted according to Bluetooth (registered trademark), a wireless LAN (IEEE802.11), IEEE802.15.4 such as ZigBee (registered trademark), or other wireless communication standards. The positioning signal that is a Bluetooth signal may be, for example, a Bluetooth Low Energy (BLE) signal or a Bluetooth BR (Basic Rate)/EDR (Enhanced Data Rate) signal. The radio wave frequency of the positioning signal is not particularly limited, but may be, for example, in the range of 300 MHz to 300 GHz. The positioning signal may be transmitted by broadcast or unicast, for example. From the viewpoint of being able to transmit the positioning signal without identifying the communication partner, it is suitable for the signal to be transmitted by broadcast.

The positioning signal transmitted from the terminal device 5 is received by each of the first receiving unit set 31 and the second receiving unit set 32, and the position of the terminal device 5 is identified based on a strength difference of the received positioning signal. For this identification of the position, see Patent Document 1 above. The strength difference of the positioning signal may be, for example, a difference in the received signal strength indicator (RSSI) of the positioning signal. If the first and second receiving unit sets 31 and 32 each include two or more receiving units, the strength difference may be, for example, a difference between representative values of the multiple received signal strengths acquired by the two or more receiving units in each of the first and second receiving unit sets 31 and 32. The representative values may be, for example, an average value, a median value, or the like. If the first and second receiving unit sets 31 and 32 each include two or more receiving units, the two or more receiving units are preferably of equal performance. For example, the gains of the antennas of the two or more receiving units included in the first receiving unit set 31 or the second receiving unit set 32 are preferably the same.

As indicated by the broken arrows in FIG. 3, the first and second receiving unit sets 31 and 32 may receive both linear waves and reflected waves of the positioning signal. The reflected waves are, for example, radio waves of the positioning signal reflected off a wall, a floor, a ceiling, or other scattering reflectors 7 present in real space. If both linear waves and reflected waves are received in this manner, interference is caused by multipath of the positioning signal. As will be described later, the acquiring unit 13 acquires a relationship between the strength difference and the range of the distance from the position of the terminal device 5 to the position of the first receiving unit set 31, that is, to the first position, the range being identifiable using the positioning signal, while taking the interference into account as well. In this example, the waves are taken as linear waves and reflected waves for the sake of convenience, but may be understood as waves that are transmitted over the shortest distance and those that are not.

The accepting unit 11 accepts a distance parameter indicating a distance in real space between a first position, which is the position of the first receiving unit set 31, and a second position, which is the position of the second receiving unit set 32, with respect to identification of the position of the terminal device 5 based on a strength difference of the positioning signal that is received by each of the first receiving unit set 31 and the second receiving unit set 32. FIG. 3 shows this distance parameter as D. If the actual distance between the first and second receiving unit sets 31 and 32 in real space is equal to the distance parameter of the first and second receiving unit sets 31 and 32, there are no later-described shielding members arranged so as to surround the first and second receiving unit sets 31 and 32. On the other hand, if such shielding members are arranged, the actual distance and the distance parameter are different from each other. The distance parameter that is accepted by the accepting unit 11 is typically input by the user of the simulation apparatus 1. The user may repeatedly input different distance parameters to determine the distance parameter, for example. Then, the multiple distance parameters may be sequentially accepted by the accepting unit 11.

The accepting unit 11 may accept information input from an input device (i.e., a keyboard, a mouse, a touch panel, etc.) or may receive information transmitted via a wired or wireless communication line, for example. The accepting unit 11 may or may not include a device (i.e., an input device, a communication device, etc.) for acceptance. The accepting unit 11 may be realized by hardware or by software such as a driver that drives a given device.

Information that is used by the acquiring unit 13 to acquire a relationship between the strength difference and the range of the distance from the position of the terminal device 5 to the first position, the range being identifiable using the positioning signal, such as a formula that is used to acquire the range, for example, may be stored in the storage unit 12. There is no limitation on the procedure in which information is stored in the storage unit 12. For example, information may be stored in the storage unit 12 via a recording medium, information transmitted via a communication line or the like may be stored in the storage unit 12, or information input via an input device may be stored in the storage unit 12. The storage unit 12 is preferably a non-volatile recording medium, but may alternately be realized by a volatile recording medium. The recording medium may be, for example, a semiconductor memory, a magnetic disk, an optical disk, or the like.

The acquiring unit 13 acquires, using the distance parameter accepted by the accepting unit 11, a relationship between the strength difference of the positioning signal received by the first and second receiving unit sets 31 and 32 and the smallest and largest values of the distance from the position of the terminal device 5 to the first position, the distance being identifiable using the positioning signal, while taking into account interference caused by multipath of the positioning signal. Details of the acquisition of this relationship will be described later.

The output unit 14 outputs the result of the acquisition by the acquiring unit 13, that is, the relationship between the strength difference and the smallest and largest values of the distance from the position of the terminal device 5 to the first position. This output may be, for example, display on a display device (i.e., a liquid crystal display, an organic EL display, etc.), transmission to a given device via a communication line, printing by a printer, accumulation in a recording medium, or delivery to another constituent element. The output unit 14 may or may not include a device (i.e., a display device, a communication device, etc.) for output. The output unit 14 may be realized by hardware or software such as a driver that drives such a device.

Next, the relationship between the strength difference acquired while taking into account interference caused by multipath of the positioning signal and the distance from the terminal device 5 to the first receiving unit set 31 will be described. In this embodiment, as shown in FIG. 3, a case will be mainly described in which the distance from the terminal device 5 to the first receiving unit set 31 is shorter than the distance from the terminal device 5 to the second receiving unit set 32, that is, the first receiving unit set 31 is a near-side receiving unit set.

Figure 4:
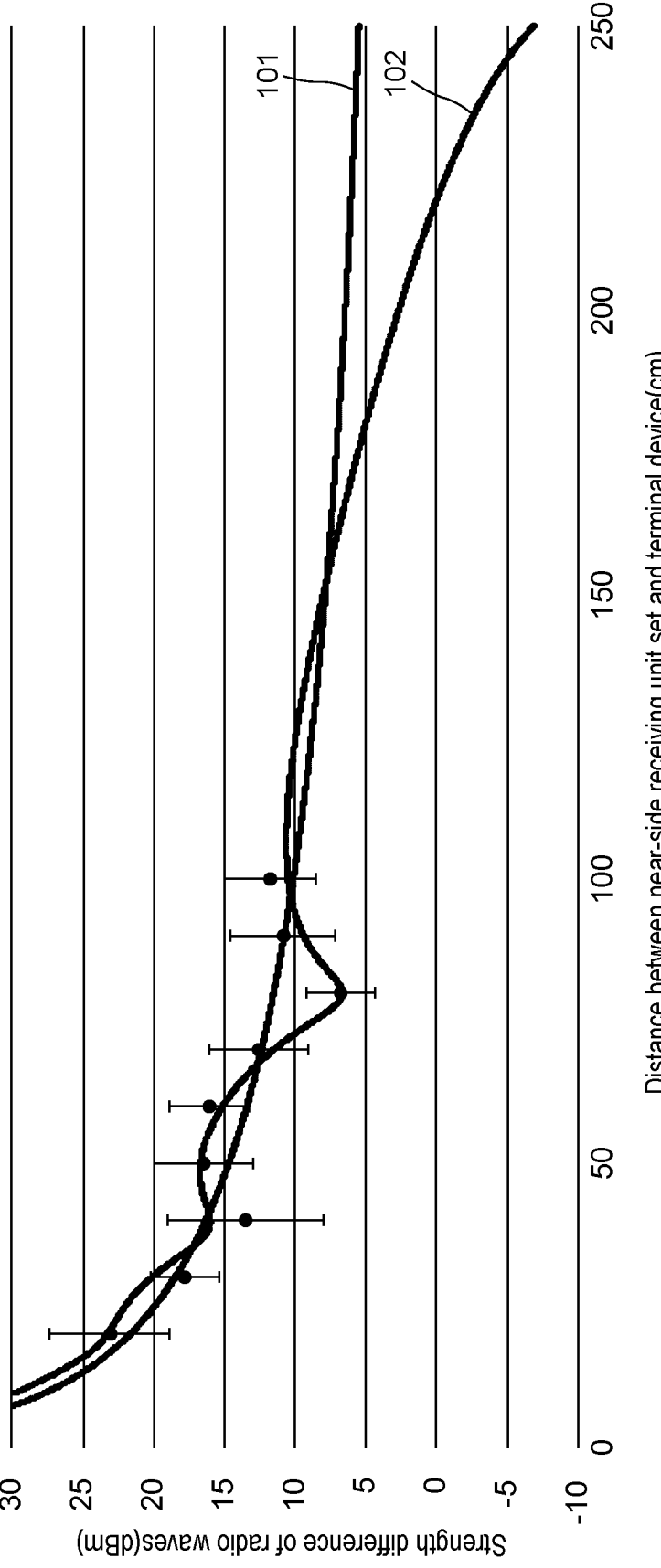
FIG. 4 is a diagram showing an example of a relationship between the strength difference of radio waves and the distance from a terminal device to a receiving unit set according to the embodiment.

First, the influence of interference caused by multipath will be described with reference to FIG. 4. In FIG. 4, a graph 101 shows a relationship between the strength difference calculated without taking interference into account and the distance between the near-side receiving unit set and the terminal device 5, and a graph 102 shows a relationship between the strength difference calculated while taking into account interference caused by multipath and the distance between the near-side receiving unit set and the terminal device 5. The black circles indicate experimental values that show the results of experiments conducted in environments where interference can occur. The error bars indicate a range of ±20. As can be seen from FIG. 4, the graph 102 is more consistent with the experimental values than the graph 101. Accordingly, it can be seen that it is appropriate to take interference into account. When there is an influence of interference, there will be a width in the distance to the terminal device 5 that transmits a positioning signal, as shown in the graph 102 in FIG. 4. For example, in FIG. 4, if the strength difference of the positioning signal at the first and second receiving unit sets 31 and 32 is 8 dBm, the distance between the first receiving unit set 31 and the terminal device 5 may be shorter than 100 cm or about 150 cm. If this is not taken into account when arranging the first and second receiving unit sets 31 and 32, the terminal device 5 may be incorrectly identified as being nearby even though it is far away, or conversely, the terminal device 5 may be incorrectly identified as being far away even though it is nearby. Therefore, it is preferable to acquire the width of the distance to the terminal device 5 when there is an influence of interference. The acquiring unit 13 of the simulation apparatus 1 acquires the width.

Figure 5:
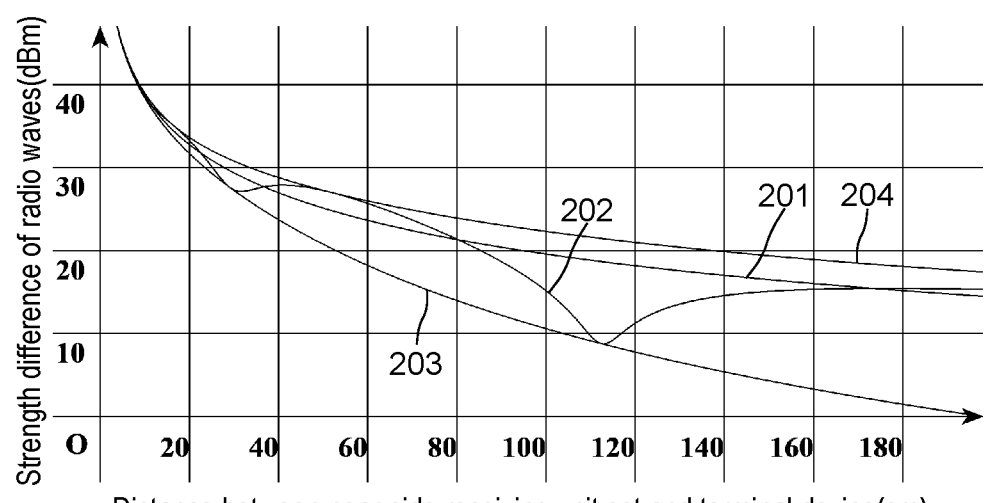
FIG. 5 is a diagram showing an example of a relationship between the strength difference of radio waves and the distance from the terminal device to the receiving unit set according to the embodiment.

FIG. 5 is a graph showing a relationship between the strength difference of the positioning signal and the distance between the near-side receiving unit set and the terminal device 5, as with FIG. 4. A graph 201 in FIG. 5 shows a relationship between the strength difference calculated without taking interference into account and the distance between the near-side receiving unit set and the terminal device 5, and a graph 202 shows a relationship between the strength difference calculated while taking into account interference caused by multipath and the distance between the near-side receiving unit set and the terminal device 5. When there is an influence of interference, there are positions where linear waves and reflected waves (i.e., interference waves) strengthen and weaken each other, and thus the graph 202 has ranges where the strength difference is larger and ranges where it is smaller than in the graph 201, but graph 202 is within the range between a graph 203 on the lower end side and a graph 204 on the upper end side. The graph 202 takes into account interference caused by only one reflected wave, but, if two graphs serving as the boundaries that are a graph on the lower end side and a graph on the upper end side regarding all graphs taking into account interference caused by multipath can be identified, it will be possible to acquire, for each strength difference, the smallest and largest values of the distance from the position of the terminal device 5 to the first position, the distance being identifiable using the positioning signal. Hereinafter, a method for identifying the two graphs serving as the boundaries will be specifically described. It is sufficient that all graphs taking into account interference caused by multipath, which show a relationship between the strength difference and the distance from the position of the terminal device 5 to the first position, are included between the two graphs serving as the boundaries. Accordingly, the two graphs serving as the boundaries are preferably graphs that indicate the smallest and largest values at each distance (i.e., each value on the horizontal axis) on all graphs taking into account interference caused by multipath, but, as long as all graphs taking into account interference caused by multipath are included between the two graphs serving as the boundaries, they may be graphs that indicate boundaries close to the smallest and largest values.

As shown in FIG. 3, if the distance from the terminal device 5 to the first receiving unit set 31 arranged at the first position is L and the distance between the first receiving unit set 31 and the second receiving unit set 32 arranged at the second position is D, the strength difference of the positioning signal calculated without taking interference into account is as shown in the following formula. In the formula, the received strength difference is taken as p.

$$p = -20 \log_{10}\left(\frac{L}{L+D}\right)$$

On the other hand, when interference is taken into account, the received strength difference p is as shown in the following formula. In the formula, A is the wavelength of radio waves of the positioning signal, and S is a parameter regarding interference. Hereinafter, this parameter S may be referred to as an "interference parameter". In this example, it is assumed that the length of the propagation path of reflected waves to the first receiving unit set 31 is $(L^2+S^2)^{1/2}$. The influence of reflected waves is not taken into account for the second receiving unit set 32. This is because it is the first receiving unit set 31 on the near side that is most affected by reflected waves.

$$p = 10 \log_{10}\left|\frac{1}{L^2}e^{2\pi i \frac{L}{\lambda}} + \frac{1}{L^2+S^2}e^{2\pi i \frac{\sqrt{L^2+S^2}}{\lambda}}\right| + 20\log_{10}(L+D) \tag{0}$$

This formula can be transformed to the following formula.

$$10^{\frac{p}{10}} =$$

$$(L+D)^2\sqrt{\frac{1}{L^4} + \frac{1}{(L^2+S^2)^2} + \frac{2}{L^2(L^2+S^2)}\cos\left(2\pi\frac{\sqrt{L^2+S^2}-L}{\lambda}\right)} \tag{1}$$

First, the smallest value of the distance from the position of the terminal device 5 to the first position will be examined. That is to say, the lower boundary of graphs regarding a relationship between the received strength difference and the distance from the position of the terminal device 5 to the first position will be examined. This lower boundary is the boundary that is located on the lower side of all of transformed graphs obtained by transforming the graph 202 shown in FIG. 5 by changing the interference parameter S. That is to say, at each distance, the values of all of transformed graphs obtained by transforming the graph 202 by changing the interference parameter S are greater than or equal to the value of the lower boundary. In order to examine this lower boundary, it is sufficient to examine the case in which the cosine is set to −1 in the right side of Formula (1). If the cosine is set to −1 in the right side of Formula (1), the following formula is obtained.

$$10^{\frac{p}{10}} = \frac{S^2(L+D)^2}{L^2(L^2+S^2)}$$

As described above, the graph serving as the lower boundary may exist on the lower side of the graph shown in the above formula, and thus a relationship between the received strength difference p and the distance L including the graph serving as the boundary is as shown in the following formula. It may be said that what is shown in the following formula is the relationship between the received strength difference p and the distance L that is less than or equal to the lower limit when the interference parameter is S.

$$10^{\frac{p}{10}} \le \frac{S^2(L+D)^2}{L^2(L^2+S^2)}$$

Since the argument of the cosine in Formula (1) is 0 or more, if the cosine is −1, the argument of the cosine has to be greater than n, as follows.

$$2\pi\frac{\sqrt{L^2+S^2}-L}{\lambda} \ge \pi$$

This inequality can be transformed to the inequality on the left side in the following formula. Since the wavelength λ is a real number greater than 0, the inequality on the right side in the following formula holds.

$$S^2 \ge \lambda L + \frac{\lambda^2}{4} > \lambda L$$

Furthermore, this inequality showing the relationship between the received strength difference p and the distance L that is less than or equal to the lower limit when the interference parameter is S can be transformed to the following formula.

$$\frac{(L+D)^2 - 10^{\frac{p}{10}}L^2}{10^{\frac{p}{10}}L^4} \ge \frac{1}{S^2}$$

Furthermore, $1/(\lambda L) > 1/S^2$ is obtained from $S^2 > \lambda L$. Accordingly, if the received strength difference p and the distance L satisfy the following formula, the above-mentioned formula is also satisfied, and thus the following formula is used to obtain the lower boundary. The following formula is an inequality showing a relationship between the received strength difference p and the distance L including the graph serving as the lower boundary, which holds for all interference parameters S.

$$\frac{(L+D)^2 - 10^{\frac{p}{10}}L^2}{10^{\frac{p}{10}}L^4} > \frac{1}{\lambda L}$$

This formula can be rewritten as follows.

$$\lambda D^2 > 10^{\frac{p}{10}}L^3 + \lambda\left(10^{\frac{p}{10}} - 1\right)L^2 - 2\lambda DL$$

Furthermore, if the received strength difference p and the distance L satisfy the following formula, the above-mentioned formula is also satisfied, and thus the following formula is used to obtain the lower boundary.

$$\lambda D^2 > 10^{\frac{p}{10}}\left(L + \frac{\lambda\left(10^{\frac{p}{10}} - 1\right)}{3 \times 10^{\frac{p}{10}}}\right)^3$$

This inequality can be rewritten as follows.

$$L < \sqrt[3]{\frac{\lambda D^2}{10^{\frac{p}{10}}} - \frac{\lambda\left(10^{\frac{p}{10}} - 1\right)}{3 \times 10^{\frac{p}{10}}}} \qquad (2)$$

Accordingly, if the distance D and the wavelength $\lambda$ are fixed, the relationship between the received strength difference p and the distance L that is less than the lower limit, that is, the relationship that cannot hold between the received strength difference p and the distance L is as shown in Formula (2). The graph showing the relationship between the distance L and the received strength difference p, with the inequality sign in Formula (2) changed to an equal sign, is the graph serving as the lower boundary.

Next, the largest value of the distance from the position of the terminal device 5 to the first position will be examined. That is to say, the upper boundary of graphs regarding a relationship between the received strength difference and the distance from the position of the terminal device 5 to the first position will be examined. This upper boundary is the boundary that is located on the upper side of all of transformed graphs obtained by transforming the graph 202 shown in FIG. 5 by changing the interference parameter S. That is to say, at each distance, the values of all of transformed graphs obtained by transforming the graph 202 by changing the interference parameter S are less than or equal to the value of the upper boundary. In order to examine this upper boundary, it is sufficient to examine the case in which the cosine is set to 1 in the right side of Formula (1). If the cosine is set to 1 in the right side of Formula (1), the following formula is obtained.

$$10^{\frac{p}{10}} = \left(\frac{1}{L^2} + \frac{1}{L^2 + S^2}\right)(L + D)^2$$

As described above, the graph serving as the upper boundary may exist on the upper side of the graph shown in the above formula, and thus a relationship between the received strength difference p and the distance L including the graph serving as the boundary is as shown in the following formula. It may be said that what is shown in the following formula is the relationship between the received strength difference p and the distance L that is greater than or equal to the upper limit when the interference parameter is S.

$$10^{\frac{p}{10}} \geq \left(\frac{1}{L^2} + \frac{1}{L^2 + S^2}\right)(L + D)^2$$

This formula can be transformed to the following formula.

$$\frac{L}{L + D}\sqrt{10^{\frac{p}{10}}} \geq \sqrt{\frac{L^2}{L^2 + S^2} + 1}$$

The right side of this formula is $2^{1/2}$ or less. Accordingly, if the received strength difference p and the distance L satisfy the following formula, the above-mentioned formula is also satisfied, and thus the following formula is used to obtain the upper boundary. The following formula is an inequality showing a relationship between the received strength difference p and the distance L including the graph serving as the upper boundary, which holds for all interference parameters S.

$$\frac{L}{L + D}\sqrt{10^{\frac{p}{10}}} \geq \sqrt{2}$$

This formula can be transformed to the following formula.

$$L \geq \frac{\sqrt{2}\,D}{\sqrt{10^{\frac{p}{10}}} - \sqrt{2}} \qquad (3)$$

If the distance D is fixed, the relationship between the received strength difference p and the distance L that is greater than or equal to the upper limit is as shown in Formula (3). The graph showing the relationship between the distance L and the received strength difference p, with the inequality sign in Formula (3) changed to an equal sign, is the graph serving as the upper boundary.

Figure 6A:
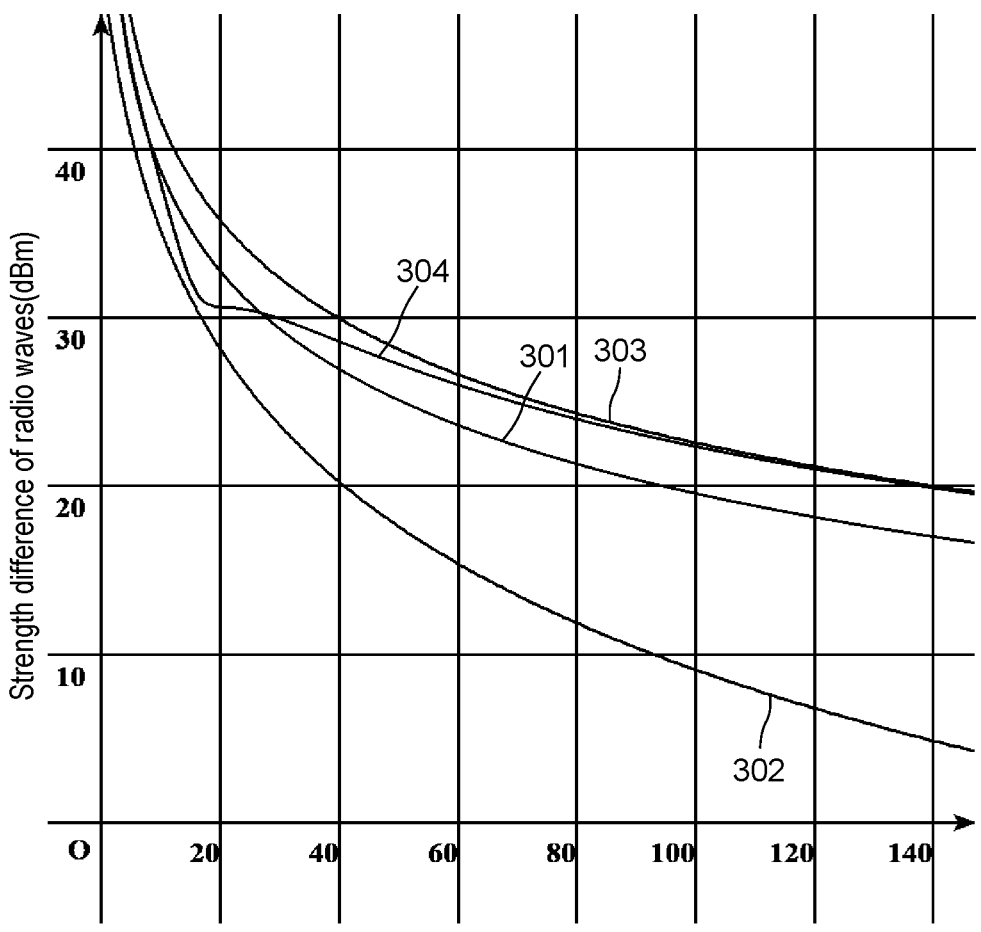
FIG. 6A is a diagram showing an example of a relationship between the strength difference of radio waves and the range in which the position of the terminal device can be identified according to the embodiment.
Figure 6B:
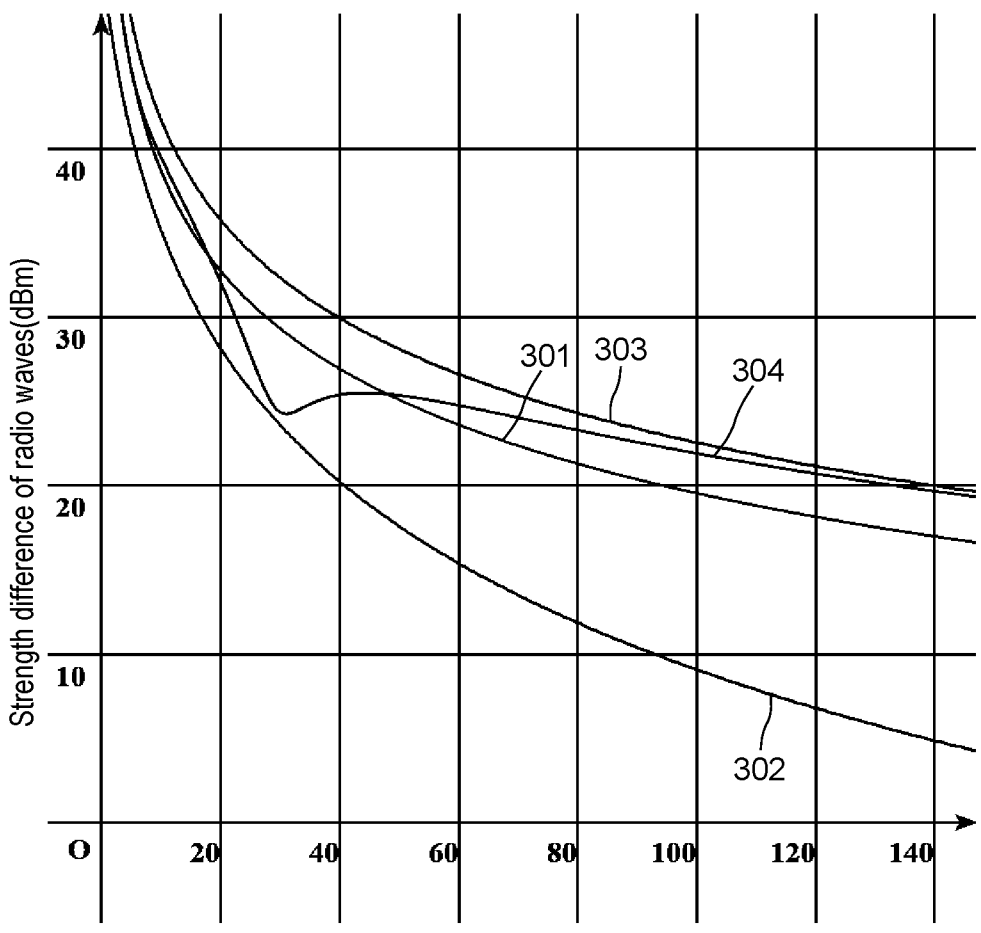
FIG. 6B is a diagram showing an example of a relationship between the strength difference of radio waves and the range in which the position of the terminal device can be identified according to the embodiment.
Figure 6C:
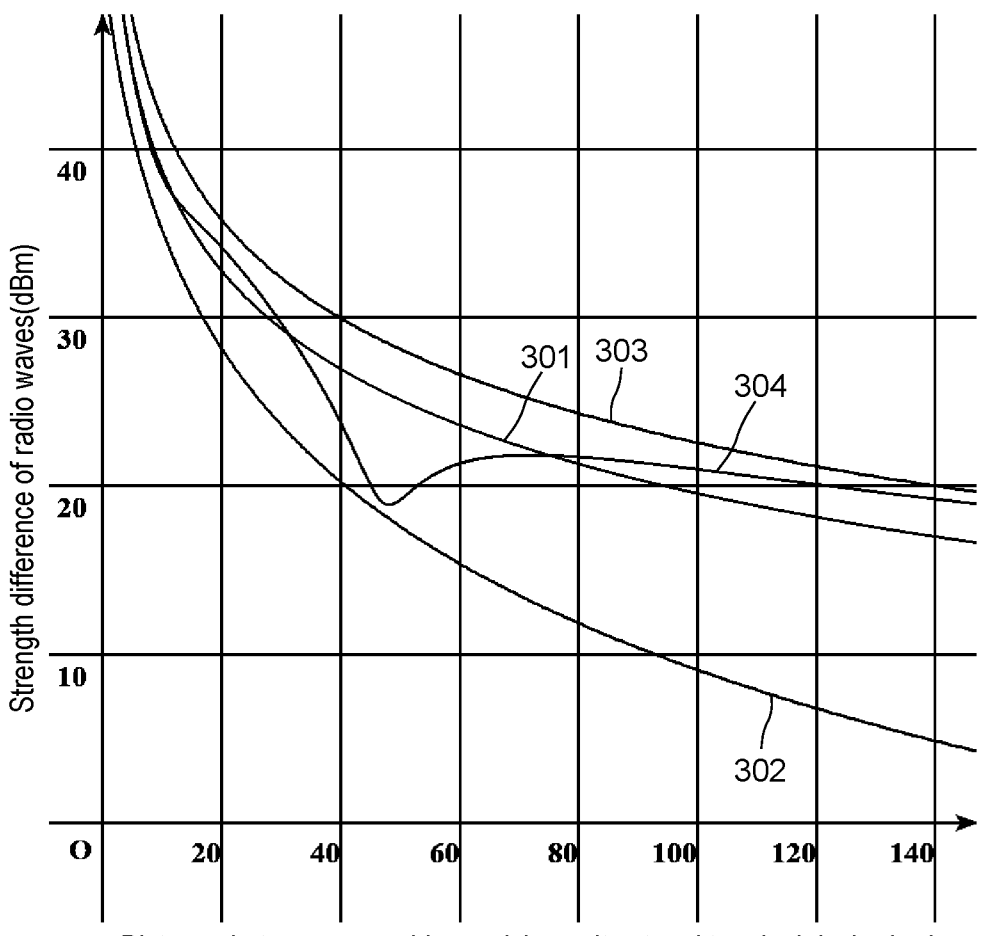
FIG. 6C is a diagram showing an example of a relationship between the strength difference of radio waves and the range in which the position of the terminal device can be identified according to the embodiment.
Figure 6D:
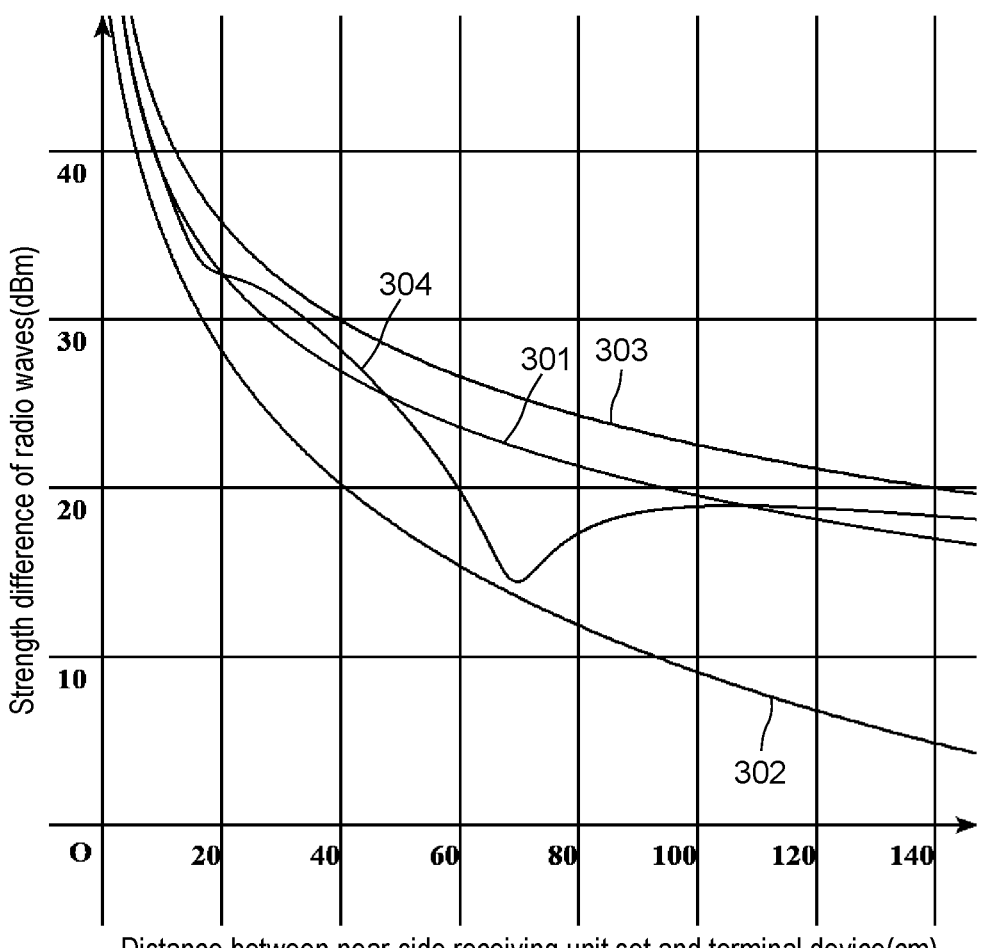
FIG. 6D is a diagram showing an example of a relationship between the strength difference of radio waves and the range in which the position of the terminal device can be identified according to the embodiment.
Figure 6E:
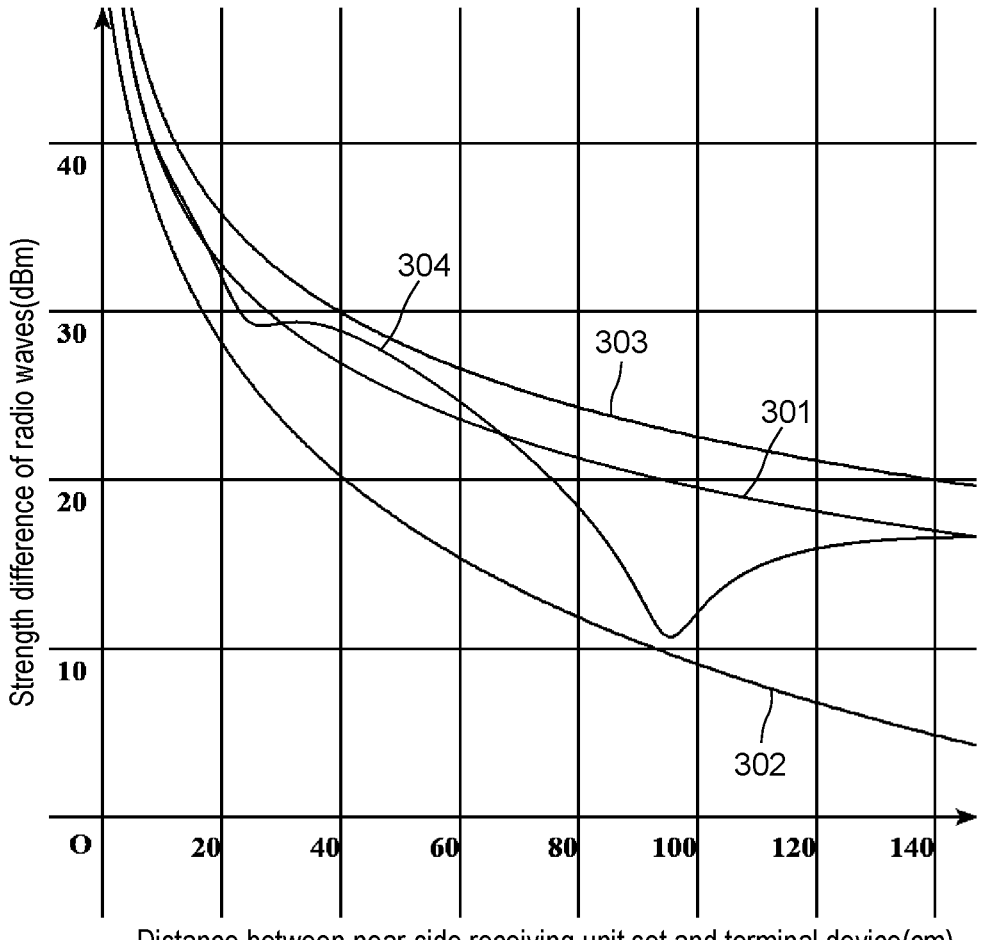
FIG. 6E is a diagram showing an example of a relationship between the strength difference of radio waves and the range in which the position of the terminal device can be identified according to the embodiment.

In this manner, the formula with the inequality sign in Formulas (2) and (3) changed to an equal sign can identify two graphs serving as the boundaries between which all graphs showing a relationship between the received strength difference p and the distance L between the near-side receiving unit set and the terminal device 5, no matter what value the interference parameter S may take. FIGS. 6A to 6E are diagrams showing the graphs serving as the boundaries. In FIGS. 6A to 6E, a graph 301 shows a relationship between the strength difference calculated without taking interference into account and the distance between the near-side receiving unit set and the terminal device 5. A graph 302 is the lower boundary, a graph 303 is the upper boundary, and a graph 304 shows a relationship between the strength difference calculated while taking into account interference caused by multipath corresponding to a given interference parameter S and the distance between the near-side receiving unit set and the terminal device 5. The value of the interference parameter S gradually increases from FIG. 6A to FIG. 6E. As can be seen from the graphs in FIGS. 6A to 6E, even if the graph 304 is drawn while changing the interference parameter S, the graph 304 is always sandwiched between the graph 302 serving as the lower boundary and the graph 303 serving as the upper boundary in close proximity. Accordingly, it can be seen that the graphs 302 and 303 serving as the boundaries are properly obtained. The graphs 302 and 303 are graphs when a given distance D and a given wavelength $\lambda$ are set. With the graphs 302 and 303 serving as the boundaries, it is possible to identify, for each strength difference, the smallest and largest values of the distance from the position of the terminal device 5 to the first position, the distance being identifiable using the positioning signal. For example, it can be seen that, if the strength difference is 20 dBm, the position of the terminal device 5 that is located in the range where the distance L is from about 40 to 140 cm can be identified. Accordingly, the relationship between the strength difference of the positioning signal and the smallest and largest values of the distance from the position of the terminal device 5 to the first position, the distance being identifiable using the positioning signal, which is acquired by the acquiring unit 13, may be two graphs serving as the boundaries shown in FIG. 6A, for example. More specifically, the acquiring unit 13 may acquire two graphs serving as the boundaries by substituting the distance parameter D accepted by the accepting unit 11 and the wavelength λ of the positioning signal set in advance in the storage unit 12 for the formulas with the inequality signs in Formulas (2) and (3) changed to equal signs, which are stored in the storage unit 12. The graphs 302 and 303 in FIG. 6A show that, for example, if a strength difference of 20 dBm or more is used to identify the position, the position of the terminal device 5 at a distance L of about 140 cm or more will not be identified and the position of the terminal device 5 at a distance L of about 40 cm or less can be reliably identified. Therefore, if the first and second receiving unit sets 31 and 32 are arranged according to the distance parameter corresponding to the graphs 302 and 303, and processing according to the identification of the position of the terminal device 5 (i.e., processing of unlocking a door, processing of enabling purchase of a product from a vending machine, etc.) only in the case in which the received strength difference of the positioning signal received by the receiving unit sets is 20 dBm or more, the processing is reliably performed when the terminal device 5 is within about 40 cm from the first receiving unit set 31, and the processing is not performed when the terminal device 5 is not within about 140 cm from the first receiving unit set 31. In order to perform such control, a threshold value regarding the received strength difference may be identified using the relationship between the strength difference and the smallest and largest values of the distance from the position of the terminal device 5 to the first position, the distance being identifiable using the positioning signal, which is acquired by the acquiring unit 13.

In this example, the formulas are calculated using a two-wave model in which linear waves and reflected waves cause interference as a model for interference caused by multipath, but it will be appreciated that the formulas may be calculated using other models.

Furthermore, in this example, the case was described in which the relationship between the strength difference of the positioning signal and the smallest and largest values of the distance from the position of the terminal device 5 to the first position, the distance being identifiable using the positioning signal, is expressed in the form of graphs serving as the boundaries, but there is no limitation to this. For example, if the user inputs a strength difference p along with the distance parameter D, the strength difference p may also be accepted by the accepting unit 11, and the acquiring unit 13 may calculate the smallest and largest values of the distance from the position of the terminal device 5 to the first position, the distance being identifiable using the positioning signal, by substituting the distance parameter D, the strength difference p, and the wavelength λ for the formulas with the inequality signs in Formulas (2) and (3) changed to equal signs. In this case, the acquiring unit 13 identifies only the smallest and largest values of the distance corresponding to a specific strength difference, that is, the strength difference accepted by the accepting unit 11.

Furthermore, in this example, the case was described in which two graphs serving as the boundaries are calculated using the formulas with the inequality signs in Formulas (2) and (3) changed to equal signs, but the two graphs serving as the boundaries may be other than those described above, and the two graphs serving as the boundaries may be identified by methods other than using formulas. For example, the graph 202 in FIG. 5 is a graph in the case in which the interference parameter S is a specific value, but the graph 202 changes in accordance with a change in the interference parameter S. Accordingly, the graph connecting the smallest values at the respective distances among the local minimum values of the graph 202 when the interference parameter S is varied from 0 to a sufficiently large value corresponding to infinity may be identified as the graph serving as the lower boundary (i.e., the graph corresponding to the graph 302), and the graph connecting the largest values at the respective distances among the local maximum values of the graph 202 when the interference parameter S is varied from 0 to a sufficiently large value corresponding to infinity may be identified as the graph serving as the upper boundary (i.e., the graph corresponding to the graph 303). In this case, the graphs serving as the boundaries can be identified without using Formulas (2) and (3).

Next, an operation of the simulation apparatus 1 will be described with reference to the flowchart in FIG. 2.

(Step S101) The accepting unit 11 determines whether or not it has accepted a distance parameter. If it has accepted a distance parameter, the procedure advances to step S102, or otherwise the processing in step S101 is repeated until a distance parameter is accepted.

(Step S102) The acquiring unit 13 acquires, using the distance parameter accepted in step S101, a relationship between the strength difference of the positioning signal received by each of the first and second receiving unit sets 31 and 32 and the smallest and largest values of the distance from the position of the terminal device 5 to the first position, the distance being identifiable using the positioning signal, while taking into account interference caused by multipath of the positioning signal. The acquisition of this relationship may be, for example, acquisition of two graphs serving as the boundaries using Formulas (2) and (3) as described above. The acquisition of graphs serving as the boundaries may be, for example, acquisition of an image showing the graphs serving as the boundaries.

(Step S103) The output unit 14 outputs the relationship acquired in step S102 between the strength difference and the smallest and largest values of the distance. This output may be, for example, display of the graphs serving as the boundaries. The procedure returns to step S101.

Figure 2:
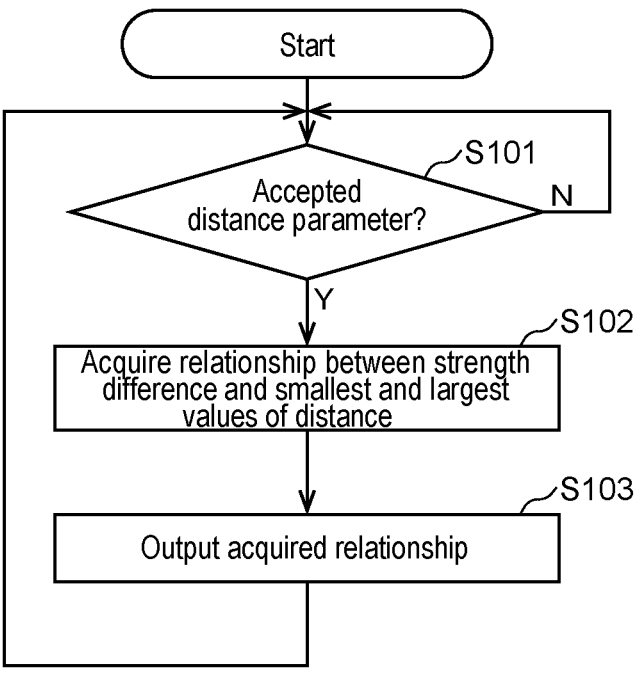
FIG. 2 is a flowchart showing an operation of the simulation apparatus according to the embodiment.

In the flowchart in FIG. 2, the processing ends at power off or at an interruption of termination processing.

Next, an example of a method for arranging the first and second receiving unit sets 31 and 32 and the like using the output results of the simulation apparatus 1 will be described. First, the user sets the wavelength λ of the positioning signal to the simulation apparatus 1. The wavelength may be accumulated in the storage unit 12, for example. If the wavelength of the positioning signal is predetermined and does not change, the wavelength of the positioning signal may be set in advance in the storage unit 12. Then, the user inputs the distance parameter D between the first position and the second position, to the simulation apparatus 1. The distance parameter D is accepted by the accepting unit 11 and passed to the acquiring unit 13. The acquiring unit 13 acquires an image of two graphs serving as the boundaries using the accepted distance parameter D, the wavelength λ set in advance, and Formulas (2) and (3) stored in the storage unit 12, and passes the image to the output unit 14. The output unit 14 outputs the image of the two graphs serving as the boundaries. The user who views the output graphs can know the smallest and largest values of the distance L, for each received strength difference p. The user then determines whether or not it is possible to identify the target position, using the output graphs serving as the boundaries. For example, in order to ensure that the position of the terminal device 5 that is located farther than 120 cm in front of a vending machine is not incorrectly identified as being within 120 cm in front of the vending machine, and that the position of the terminal device 5 that is located within 50 cm in front of the vending machine can be reliably identified, it is sufficient to confirm whether or not there is a received strength difference at which the graph serving as the upper boundary has a value of 120 cm or less and the graph serving as the lower boundary has a value of 50 cm or more in the output results of the output unit 14. If there is such a received strength difference, it is seen that the identification of the target position of the terminal device 5 can be realized by identifying the position of the terminal device 5 at a received strength difference that is greater than or equal to the received strength difference, and thus it is sufficient that the first and second receiving unit sets 31 and 32 are arranged according to the distance parameter at that point in time. On the other hand, if there is no such a received strength difference, a different distance parameter D is input to the simulation apparatus 1, and similar processing is performed until a result is output that can realize the identification of the target position of the terminal device 5.

The larger the distance parameter D, which is the distance between the first and second receiving unit sets 31 and 32 that receive the positioning signal, the more accurate the identification of the position becomes, and the smaller the distance parameter D, the less accurate the identification of the position becomes. Accordingly, when a larger distance parameter D is input, the gap from the smallest value to the largest value of the distance from the position of the terminal device 5 to the first position for each strength difference, the distance being identifiable using the positioning signal, becomes narrower. That is to say, the interference resistance is improved. On the other hand, if the distance parameter D is increased, the distance (L+D) from the terminal device 5 to the second receiving unit set 32 increases, and the accuracy of identification of the position using the positioning signal will correspondingly decrease. Accordingly, it is preferable for the user to find a smaller distance parameter D that can realize the identification of a target position while inputting various distance parameters D. It is assumed that the value of the distance parameter identified in this way that can realize the identification of the target position of the terminal device 5 is DO.

After determining the distance parameter DO using the simulation apparatus 1, for example, the identification of a target position can be realized by arranging the first and second receiving unit sets 31 and 32 apart from each other by the distance parameter DO as in FIG. 3. However, it may be difficult to arrange the first and second receiving unit sets 31 and 32 apart from each other by the distance DO. For example, if the distance parameter DO is 200 cm and the length of the casing in which the first and second receiving unit sets 31 and 32 are arranged is shorter than 200 cm, it is not possible to arrange the first and second receiving unit sets 31 and 32 apart from each other by 200 cm in the casing. Meanwhile, the use of shielding members for changing a propagation distance of the positioning signal makes it possible to realize a received strength of the positioning signal that is similar to that when the first and second receiving unit sets 31 and 32 are arranged apart from each other by the distance DO, in spite of the distance therebetween in real space being shorter than the distance parameter DO. Accordingly, the use of shielding members has the effect of extending the distance between the first and second receiving unit sets 31 and 32, allowing both a more compact arrangement of the first and second receiving unit sets 31 and 32 and a more accurate detection of the position. As described above, if the distance between the first and second receiving unit sets 31 and 32 is extended, the interference resistance is improved, and thus the arrangement of the shielding members will also improve the interference resistance. Hereinafter, a method for arranging the first and second receiving unit sets 31 and 32 and shielding members for such a purpose, and a receiving apparatus having the first and second receiving unit sets 31 and 32 and the shielding members arranged in such a manner will be described.

The arranging method may include: a step of arranging the first receiving unit set 31 including one or more first receiving units that receive a positioning signal transmitted from the terminal device 5, at a first position; a step of arranging the second receiving unit set 32 including one or more second receiving units that receive the positioning signal, at a second position that is different from the first position; and a step of arranging a shielding member for changing a propagation distance of the positioning signal such that a received strength of the positioning signal that is received by the first and second receiving unit sets 31 and 32 matches a received strength of the positioning signal that is received by the first and second receiving unit sets 31 and 32 in a case in which the first and second receiving unit sets 31 and 32 are arranged in real space apart from each other by a predetermined distance DO that is longer than a distance D1 between the first position and the second position. The position of the terminal device 5 is identified using the first and second receiving unit sets 31 and 32 arranged in this manner.

Figure 7:
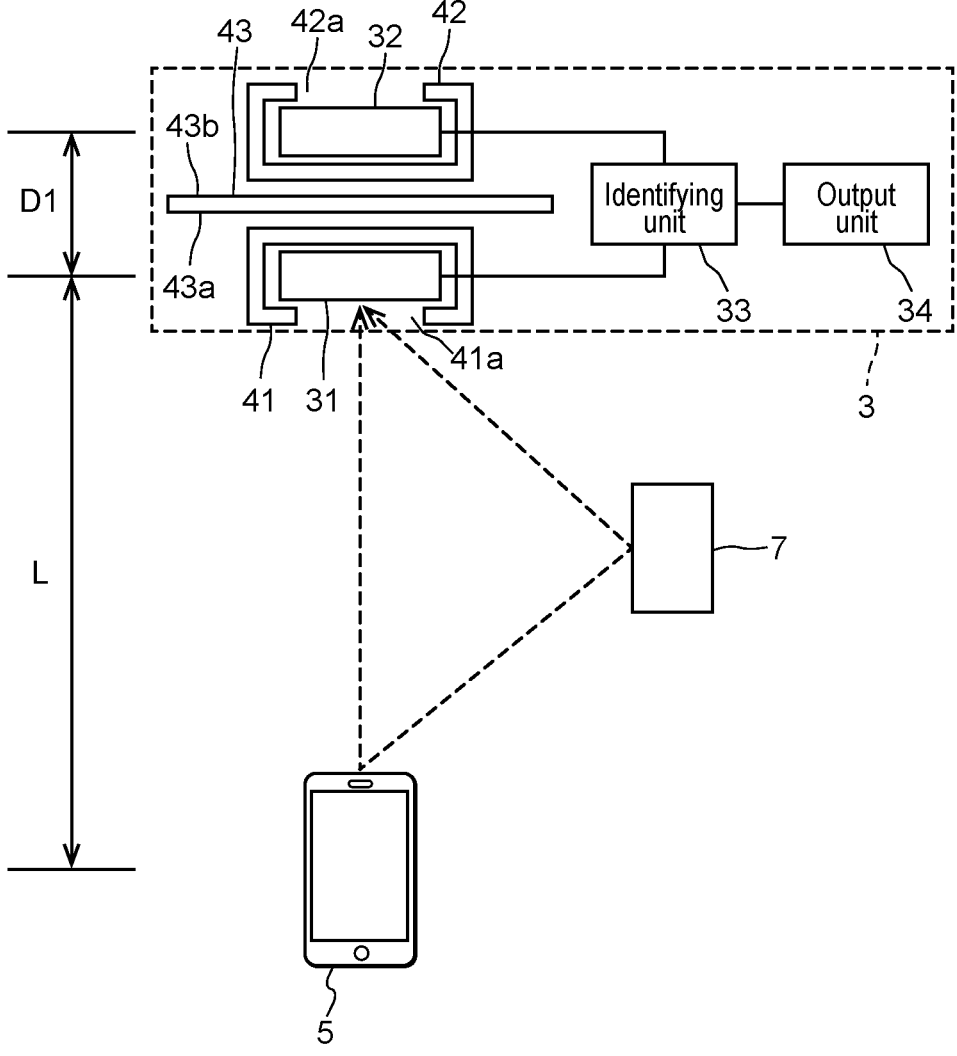
FIG. 7 is a schematic diagram showing the configuration of a receiving apparatus according to the embodiment.

FIG. 7 is a schematic diagram showing a receiving apparatus 3 including the first and second receiving unit sets 31 and 32 arranged in such a manner, a first shielding member 41, a second shielding member 42, a planar shielding member 43, an identifying unit 33, and an output unit 34. In FIG. 7, the first and second shielding members 41 and 42 are shown in cross-section such that the first and second receiving unit sets 31 and 32 inside are visible. In FIG. 7, the broken arrows indicating the positioning signal that is received by the second receiving unit set 32 are not shown for the sake of convenience.

The first and second receiving unit sets 31 and 32 are arranged apart from each other by a distance D1. That is to say, in FIG. 7, the distance between the first position and the second position is D1. The distance D1 and the first and second positions may be selected as appropriate according to the constraints in the environment where the first and second receiving unit sets 31 and 32 are arranged. However, the distance D1 is shorter than the distance parameter DO determined as described above. The first receiving unit set 31 is arranged on the side of a first face 43a of the planar shielding member 43, and the second receiving unit set 32 is arranged on the side of a second face 43b of the planar shielding member 43. The second face 43b is a face that is different from the first face 43a.

The first shielding member 41 is arranged so as to surround the first receiving unit set 31. The first shielding member 41 has an opening portion 41a. The first shielding member 41 may be, for example, in the shape of a box that can accommodate the first receiving unit set 31. The shape of the first shielding member 41 may be, for example, cuboid as shown in FIG. 7, spherical, cylindrical, or any other shape. In FIG. 7, the case is shown in which the opening portion 41a is located near the center of one of the six faces constituting the first shielding member 41 having a cuboid shape, but one of the six faces of the first shielding member 41 having a cuboid shape may be open, for example.

The second shielding member 42 is arranged so as to surround the second receiving unit set 32. The second shielding member 42 has an opening portion 42a. The second shielding member 42 is similar to the first shielding member 41, except that the constituent element arranged inside is the second receiving unit set 32.

The first and second shielding members 41 and 42 are preferably arranged on the two sides of the planar shielding member 43 respectively such that the vector from the center of the first receiving unit set 31 to the center of the opening portion 41a and the vector from the center of the second receiving unit set 32 to the center of the opening portion 42a are in different directions, for example. In particular, they are preferably arranged such that these vectors are in opposite directions as shown in FIG. 7. This is because this arrangement allows a shorter distance D1 to realize the same received strength as a longer distance D. The centers of the first and second receiving unit sets 31 and 32 or the centers of the opening portions 41a and 42a may be their centers of gravity. The first and second shielding members 41 and 42 may be similar and symmetrically arranged, for example. In this case, similar identification of the position can be realized even if either of the first and second receiving unit sets 31 and 32 is a receiving unit set on the near side of the terminal device 5.

The planar shielding member 43 may be, for example, a flat shielding member, a curved shielding member, or any other face-shape shielding member. The planar shielding member 43 may be, for example, a door, a room wall, a wall of a device or equipment casing, or any other face-shaped member.

The first and second shielding members 41 and 42 and the planar shielding member 43 block the positioning signal, and may be made of a material that does not transmit radio waves, for example. The material may, for example, reflect the radio waves of the positioning signal or absorb the radio waves of the positioning signal. The material that reflects radio waves may be, for example, a material that reflects 100% of the radio waves, or a material that reflects the radio waves to a similar degree. The material that absorbs radio waves may be, for example, a material that absorbs 100% of the radio waves, or a material that absorbs the radio waves to a similar degree. The material that reflects radio waves may be, for example, a metal. The material that absorbs radio waves may be, for example, an electromagnetic wave absorber that absorbs radio waves and converts them into heat. The electromagnetic wave absorber may, for example, contain a material with a high relative permittivity, such as water. A resin or other material mixed with conductive material may be used as the shielding members. The first and second shielding members 41 and 42 and the planar shielding member 43 may be used, for example, to make the propagation distance of radio waves reaching the first and second receiving unit sets 31 and 32 longer by making the radio waves be transmitted around them. For example, in FIG. 7, the radio waves of the positioning signal transmitted from the terminal device 5 bypass the planar shielding member 43 and are transmitted via the opening portion 42a of the second shielding member 42 to reach the second receiving unit set 32, and thus the propagation distance of radio waves from the terminal device 5 to the second receiving unit set 32 is longer than L+D1. In order to allow the radio waves to be transmitted around, for example, a reflector for reflecting the radio waves may or may not be placed in real space. The propagation distance may be, for example, the effective propagation distance. In this case, the effective propagation distance may be increased, for example, by placing a material with a given refractive index (i.e., a material with a high refractive index) in the propagation path of the radio waves. The effective propagation distance may be the distance felt by the radio wave. If the first receiving unit set 31 is a near-side receiving unit set, the second shielding member 42 and the planar shielding member 43 function as shielding members for changing the propagation distance of radio waves from the terminal device 5 to the second receiving unit set 32, and, if the second receiving unit set 32 is a near-side receiving unit set, the first shielding member 41 and the planar shielding member 43 function as shielding members for changing the propagation distance of radio waves from the terminal device 5 to the first receiving unit set 31. Since it is usually not known where the terminal device 5 is located, the first and second shielding members 41 and 42 and the planar shielding member 43 can be said to be shielding members for changing a propagation distance of the positioning signal transmitted from the terminal device 5.

The first and second shielding members 41 and 42 and the planar shielding member 43 are arranged such that a received strength of the positioning signal that is received by the first and second receiving unit sets 31 and 32 respectively arranged at the first and second positions matches a received strength of the positioning signal that is received by the first and second receiving unit sets 31 and 32 in a case in which the first and second receiving unit sets 31 and 32 are arranged in real space apart from each other by the predetermined distance DO. As described above, it is assumed that the gap D1 between the first and second positions is shorter than the distance DO.

Hereinafter, a method for arranging the shielding members as described above will be described. First, the first and second receiving unit sets 31 and 32 are arranged apart from each other by the distance D1, and the first and second shielding members 41 and 42 and the planar shielding member 43 are arranged. In that situation, as shown in FIG. 7, a positioning signal is transmitted from the terminal device 5 located at a distance L from the first position, that is, the position of the first receiving unit set 31, and the received strength difference thereof is measured. This measurement is repeated while changing the distance L. As a result, measurement results similar to the experimental values indicated by the black circles in FIG. 4 can be acquired. Then, an interference parameter S and a distance D in Formula (0) that fit the measurement results are identified. The identification may be performed using the least squares method, for example. If the absolute value of the difference between the distance D identified in this manner and the distance DO becomes smaller than a predetermined tolerance, it can be determined that the shielding members are arranged such that a received strength of the positioning signal that is received by the first and second receiving unit sets 31 and 32 matches a received strength of the positioning signal that is received by the first and second receiving unit sets 31 and 32 in a case in which the first and second receiving unit sets 31 and 32 are arranged in real space apart from each other by the distance DO. Accordingly, the acquisition of the measurement results and the identification of the distance D may be repeated while changing at least one of the shielding members of the first and second shielding members 41 and 42 and the planar shielding member 43 until the absolute value of the difference between the distance D identified as described above and the distance DO becomes smaller than a predetermined tolerance. It is preferable for the above measurement to be performed in a situation where the number of scattering reflectors 7 is small.

This is because if there are many scattering reflectors 7, the fitting of the measurement results to Formula (0) will be poor. It will be appreciated that the distance D may be identified by methods other than that described above.

When the terminal device 5 is at an arbitrary position, it is usually difficult to arrange the shielding members such that a received strength at the first and second receiving unit sets 31 and 32 arranged apart from each other by the distance D1 is similar to that at the first and second receiving unit sets 31 and 32 arranged apart from each other by the distance DO. Accordingly, the above-described experiment may be performed in a situation where the terminal device 5 is arranged in a detection area, which is an area where the position of the terminal device 5 is to be identified. For example, if the receiving apparatus 3 is used in a vending machine or a door, for example, the detection area may be the front side area of the vending machine or the front side area of the door. The change in the shielding members may be, for example, a change in the thickness of the shielding members, a change in the size of the opening portions 41a and 42a of the first and second shielding members 41 and 42, a change in the material of the shielding members, a change in the size or shape of the shielding members, or any other change related to the shielding members. The measurement results may be acquired by experiment in real space or by simulation, for example.

The identifying unit 33 identifies the position of the terminal device 5 based on the strength difference of the positioning signal received by each of the first receiving unit set 31 and the second receiving unit set 32. The position of the terminal device 5 may be identified using a difference between a representative value of received strengths acquired by one or more first receiving units 51 included in the first receiving unit set 31 and a representative value of received strengths acquired by one or more second receiving units 52 included in the second receiving unit set 32, for example. In identifying the position of a wave source using the received strength difference, an Apollonius circle according to the received strength difference may be identified, and the position on or within the Apollonius circle may be identified. The identified position may be indicated, for example, by a point position or a linear or areal position. The identification of the position of a wave source using the received strength difference of radio waves is already known, and thus a detailed description thereof has been omitted. For such a method of identifying the position of a wave source, see, for example, Patent Document 1 above.

In the case in which the first and second receiving unit sets 31 and 32 are respectively arranged on the two sides of the planar shielding member 43 as shown in FIG. 7, the identifying unit 33 can identify whether the terminal device 5 is located on the side of the first face 43a or on the side of the second face 43b of the planar shielding member 43 with higher accuracy. Accordingly, the identifying unit 33 may perform such identification. For example, the identifying unit 33 may determine that the terminal device 5 is located on the side of a receiving unit set that received a positioning signal with a greater received strength out of the received strengths of the positioning signal acquired by the first and second receiving unit sets 31 and 32. For example, if the received strength of the positioning signal acquired by the first receiving unit set 31 is greater than the received strength of the positioning signal acquired by the second receiving unit set 32, it may be determined that the terminal device 5 is located on the side of the first receiving unit set 31, that is, on the side of the first face 43a of the planar shielding member 43. If the side on which the terminal device 5 is located with respect to the planar shielding member 43 can be identified in this manner, processing according to the side on which the terminal device 5 is located can be performed. For example, when unlocking the door in response to the approach of the terminal device 5, the door may be unlocked when the terminal device 5 is identified as being close to the outside of the door and not unlocked when the terminal device 5 is identified as being close to the inside of the door. With this configuration, for example, a situation is avoided in which the door is accidentally unlocked when a person with terminal device 5 approaches near the inside of the door.

The output unit 34 outputs the position identified by the identifying unit 33. For example, if a threshold value for the received strength difference is set, the output unit 34 may output the identified position in the case in which the strength difference of the positioning signal received by the first and second receiving unit sets 31 and 32 is more than the threshold value, and may not output the identified position in the case in which the strength difference is less than the threshold value. In the case in which the strength difference matches the threshold value, for example, the identified position may or may not be output. In the case in which the received strength difference is less than the threshold value, the position may not be identified by the identifying unit 33 and, consequently, the position may not be output. The output unit 34 may also output, for example, the received strength difference used to identify the position, together with the identified position. In this case, the output may not be restricted according to the result of the comparison between the reception strength difference and threshold value. Then, for example, an apparatus or the like that received them may perform processing using the output position (i.e., processing of unlocking a door, etc.) in the case in which the received strength difference is more than the threshold value, and may not perform processing using the output position in the case in which the received strength difference is less than the threshold value. In the case in which the strength difference matches the threshold value, for example, the processing using the position may or may not be performed. The output may be, for example, display on a display, transmission to a given device via a communication line, printing on a printer, accumulation in a recording medium, or delivery to another constituent element. The output unit 34 may or may not include a device that provides output. The output unit 34 may be realized by hardware or software such as a driver that drives such a device.

In the method of arranging the first and second receiving unit sets 31 and 32 and the shielding members, as long as the first and second receiving unit sets 31 and 32 and the shielding members are arranged in such a way that the purpose is eventually realized, the order in which they are arranged is not limited. For example, the first and second receiving unit sets 31 and 32 may be arranged after the shielding member are arranged, or vice versa.

Although FIG. 7 shows the case in which the receiving apparatus 3 includes the first and second shielding members 41 and 42 and the planar shielding member 43, the receiving apparatus 3 may include at least one of the first and second shielding members 41 and 42 and the planar shielding member 43, for example.

Figure 8A:
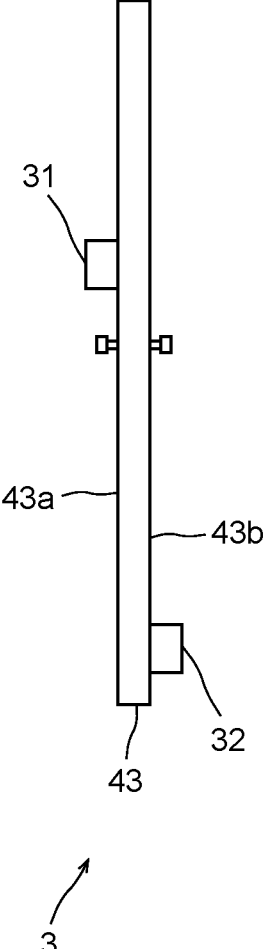
FIG. 8A is a schematic diagram showing an example of the configuration of the receiving apparatus according to the embodiment.
Figure 8B:
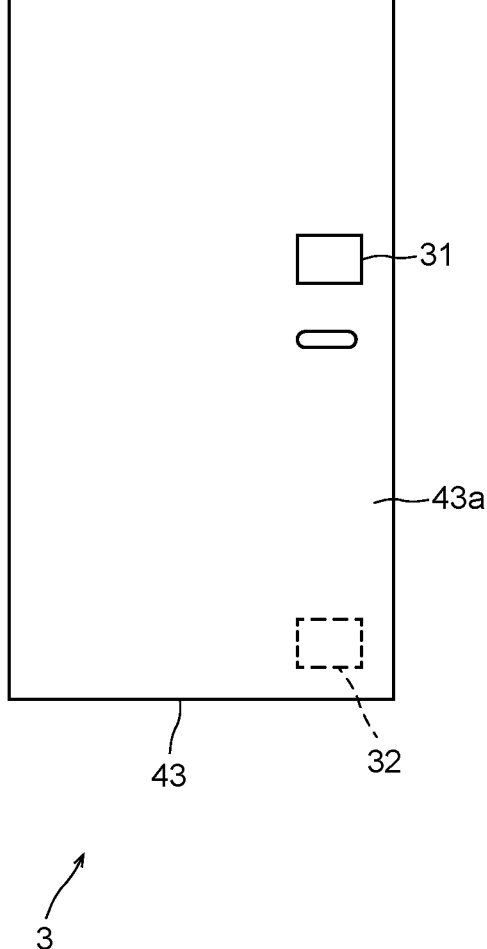
FIG. 8B is a schematic diagram showing an example of the configuration of the receiving apparatus according to the embodiment.

FIGS. 8A and 8B are diagrams showing an example of the receiving apparatus 3 not including the first and second shielding members 41 and 42. FIG. 8A is a view of a flat planar shielding member 43 serving as a door viewed from the plane direction, and FIG. 8B is a view of the planar shielding member 43 serving as a door viewed from the side of the first face 43*a*. It is assumed that the first face 43*a* is the outside of the door and the second face 43*b* is the inside of the door. In FIGS. 8A and 8B, the identifying unit 33 and the output unit 34 are not shown. The first receiving unit set 31 is located near the handle of the door, and the second receiving unit set 32 is located on the lower side of the door. That is to say, the first receiving unit set 31 and the second receiving unit set 32 are arranged at different positions in the plane direction of the planar shielding member 43. In this case, for example, the received strengths of the positioning signal at the first and second receiving unit sets 31 and 32 may be adjusted to realize desired received strengths by changing the distance of the first and second receiving unit sets 31 and 32 in the vertical direction. For example, if a part of the planar shielding member 43 is provided with an area that transmits radio waves, the received strengths of the positioning signal at the first and second receiving unit sets 31 and 32 may be adjusted to realize desired received strengths by changing the position and size of the area.

Typically, a person having the terminal device 5 is likely to be holding the terminal device 5 in his/her hand or putting it in a pocket of his/her clothes or a bag. Therefore, in the vertical direction, the distance between the terminal device 5 and the first receiving unit set 31 becomes shorter and the distance between the terminal device 5 and the second receiving unit set 32 becomes longer. Accordingly, when the person having the terminal device 5 approaches the door from the side of the first face 43*a*, the first receiving unit set 31 functions as a near-side receiving unit set, and the second receiving unit set 32 functions as a far-side receiving unit set, realizing more accurate identification of the position. When the person having the terminal device 5 approaches the door from the side of the second face 43*b*, the presence of the planar shielding member 43 makes both the first and second receiving unit sets 31 and 32 far-side receiving unit sets, reducing the accuracy of identification of the position, but this is not a particular problem as long as unlocking of the door or the like is not performed when the terminal device 5 approaches the inside of the door, for example.

Meanwhile, since the first and second receiving unit sets 31 and 32 are respectively arranged on the two sides of the planar shielding member 43, the identifying unit 33 can determine with high accuracy which side of the door the terminal device 5 is located on. For example, the identifying unit 33 may determine that the terminal device 5 is located on the side of the first face 43*a* in the case in which the received strength of the positioning signal at the first receiving unit set 31 is greater than a predetermined first threshold value and the received strength difference of the positioning signal between the first and second receiving unit sets 31 and 32 is greater than a predetermined second threshold value, and may determine that the terminal device 5 is located on the side of the second face 43*b* in the case in which the received strength of the positioning signal at the second receiving unit set 32 is greater than a predetermined third threshold value and the received strength difference of the positioning signal between the first and second receiving unit sets 31 and 32 is less than a predetermined fourth threshold value.

In the receiving apparatus 3 shown in FIGS. 8A and 8B, at least one of the first and second shielding members 41 and 42 may be provided. In FIGS. 8A and 8B, the second receiving unit set 32 is located on the lower side of the door, but the second receiving unit set 32 may be located on the upper side of the door.

Furthermore, in FIGS. 8A and 8B, the case was described in which the first and second receiving unit sets 31 and 32 are respectively arranged on the two sides of the planar shielding member 43, but the first and second receiving unit sets 31 and 32 may be arranged on one side of the planar shielding member 43. In this case as well, as in FIGS. 8A and 8B, the first and second receiving unit sets 31 and 32 may be arranged at different positions in the plane direction of the planar shielding member 43. For example, the first receiving unit set 31 may be located near the handle of the planar shielding member 43 serving as a door, and the second receiving unit set 32 may be located on the lower or upper side of the planar shielding member 43 serving as a door. In this case, the shielding member does not have the effect of extending the distance between the first and second receiving unit sets 31 and 32, but it is possible to identify which side of the planar shielding member 43 the terminal device 5 is located on. Therefore, for example, if the first and second receiving unit sets 31 and 32 are arranged on the outside of the planar shielding member 43 serving as a door, for example, the position of the terminal device 5 that is located on the outside of the planar shielding member 43 may be identified, and the position of the terminal device 5 that is located on the inside of the planar shielding member 43 may not be identified.

As described above, using the accepted distance parameter, the simulation apparatus 1 and the simulation method according to this embodiment can acquire, for each accepted distance parameter, a relationship between the received strength difference of the positioning signal between the first and second receiving unit sets 31 and 32 and the smallest and largest values of the distance from the position of the terminal device 5 to the position of the first receiving unit set 31, the distance being identifiable using the positioning signal, while taking into account interference caused by multipath of the positioning signal. Accordingly, it is possible to identify, using the relationship, a distance parameter suitable to perform identification of the target position.

Furthermore, the arranging method and the receiving apparatus 3 according to this embodiment can, using the shielding members, identify the position of the terminal device 5 with the same accuracy as when the first and second receiving unit sets 31 and 32 are arranged apart from each other by a distance that is longer than a distance therebetween in real space. This makes the system more compact. In addition, the longer the distance between the first and second receiving unit sets 31 and 32, the more the interference caused by multipath of the positioning signal the influence can be reduced, and thus it is possible to realize more accurate position identification with improved interference resistance, by arranging the shielding members. Since the first and second receiving unit sets 31 and 32 are respectively arranged on the two sides of the planar shielding member 43, it is also possible to identify which side of the planar shielding member 43 the terminal device 5 is located on.

In this embodiment, the case was described in which the receiving apparatus 3 includes the identifying unit 33 and the output unit 34, but there is no limitation to this. The receiving apparatus 3 may not include the identifying unit 33 or the output unit 34. In this case, the processing for identifying the position of the terminal device 5 using the received strength difference of the positioning signal received by the first and second receiving unit sets 31 and 32 may be performed by an external apparatus. Therefore, for example, the received strength difference of the positioning signal received by the first and second receiving unit sets 31 and 32 may be output to the external apparatus.

Furthermore, the receiving apparatus 3 according to this embodiment may authenticate the terminal device 5 using a positioning signal or another signal transmitted together with the positioning signal. Then, if the terminal device 5 is determined as being legitimate through that authentication, predetermined processing may be performed.

Lastly, examples of apparatuses and systems in which the receiving apparatus 3 according to this embodiment is implemented will be briefly described.

The receiving apparatus 3 may be incorporated into an automatic ticket gate, for example. If the position of the terminal device 5 identified by the receiving apparatus 3 is within a predetermined range and the terminal device 5 is determined as being legitimate through authentication processing, the gate of the automatic ticket gate may open to allow the user with the terminal device 5 to enter or exit the ticket gate. The user may also be charged when the user enters or exits the ticket gate. In this manner, for example, the user can board a train and the like without operating a smartphone or the like serving as the terminal device 5.

Furthermore, the receiving apparatus 3 may be incorporated into a door, for example. If the position of the terminal device 5 identified by the receiving apparatus 3 is within a predetermined range and the terminal device 5 is determined as being legitimate through authentication processing, the door may be automatically unlocked. In this manner, for example, the user with the terminal device 5 can unlock the door without operating the terminal device 5. This door may be, for example, the door to a home, the door to a hotel room, the door to the entrance of a workplace or a conference room, or the like.

Furthermore, the receiving apparatus 3 may be incorporated into a wall, for example. If the position of the terminal device 5 identified by the receiving apparatus 3 is within a predetermined range and the terminal device 5 is determined as being legitimate through authentication processing, the electrical appliances and the like in the room on the side where the terminal device 5 is located may be activated. In this manner, for example, the user with the terminal device 5 can activate the electrical appliances and the like in the room without operating the terminal device 5.

Furthermore, the receiving apparatus 3 may be incorporated into a vending machine for drinks or the like, for example. If the position of the terminal device 5 identified by the receiving apparatus 3 is within a predetermined range and the terminal device 5 is determined as being legitimate through authentication processing, when the user with the terminal device 5 operates a purchase button on the vending machine, the vending machine may provide the user with a product such as a drink in accordance with the purchase button operated by the user. The user may also be charged accordingly for the provision of the product. In this manner, for example, the user can purchase of a product from the vending machine without operating a smartphone or the like serving as the terminal device 5.

Furthermore, the receiving apparatus 3 may be incorporated into a cash register in a store, for example. If the position of the terminal device 5 identified by the receiving apparatus 3 is within a predetermined range and the terminal device 5 is determined as being legitimate through authentication processing, when the user or a clerk operates the payment button on the cash register, the cash register may charge the payment method (e.g., a credit card or electronic money) associated with the terminal device 5 according to the purchase amount. In this manner, for example, the user can purchase a product and the like at the store without operating a smartphone or the like serving as the terminal device 5.

Furthermore, the receiving apparatus 3 may be incorporated into an apparatus that requires identity authentication, such as a PC (Personal Computer) or an ATM (Automated Teller Machine), for example. If the position of the terminal device 5 identified by the receiving apparatus 3 is within a predetermined range and the terminal device 5 is determined as being legitimate through authentication processing, when the user operates an apparatus such as the PC or the ATM, the apparatus may perform processing according to the user operation. In this manner, for example, the user can authenticate his/her identity at an apparatus such as a PC or an ATM and operate that apparatus, without entering a PIN or other information.

Furthermore, the receiving apparatus 3 can also be used in situations other than those described above. For example, it may be used to authenticate users in car sharing, car rental, airplane boarding procedures, venues for concerts, sports games, seminars, and other events, museums, theme parks, sports clubs, membership lounges, or the like.

In the foregoing embodiment, the case was mainly described in which the simulation apparatus 1 is a stand-alone apparatus, but the simulation apparatus 1 may be, a stand-alone apparatus or a server apparatus in a server-client system. In the latter case, the accepting unit and the output unit may accept input or output information via a communication line.

In the foregoing embodiment, the case was mainly described in which the positioning signal is radio waves, but the positioning signal may be, for example, light such as infrared or visible light, or sound waves.

In the foregoing embodiment, each process or each function may be realized as centralized processing using a single apparatus or a single system, or may be realized as distributed processing using multiple apparatuses or multiple systems.

In the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

In the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown recording medium temporarily or for a long period of time even if not specified in the description above. Furthermore, the information may be accumulated in the unshown recording medium by each constituent element or by an unshown accumulating unit. Furthermore, the information may be read from the unshown recording medium by each constituent element or by an unshown reading unit.

In the foregoing embodiment, if information used by each constituent element or the like, for example, information such as a threshold value, an address, or various setting values used by each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The unshown accepting unit may accept the change instruction, for example, by accepting information from an input device, by receiving information transmitted via a communication line, or by accepting information read from a predetermined recording medium.

In the foregoing embodiment, each constituent element may be configured by dedicated hardware, or alternatively, constituent elements that can be realized by software may be realized by executing a program. For example, each constituent element may be realized by a program execution unit such as a CPU reading and executing a software program stored in a recording medium such as a hard disk or a semiconductor memory. At the time of executing the program, the program execution unit may execute the program while accessing the storage unit or the recording medium. The software that realizes the simulation apparatus 1 in the foregoing embodiment is a program as follows. That is, the program is a program for causing a computer to execute: a step of accepting a distance parameter indicating a distance in real space between a first position and a second position that is different from the first position, with respect to identification of a position of a terminal device whose position is to be identified based on a strength difference of a positioning signal that is transmitted from the terminal device and that is received by each of a first receiving unit set arranged at the first position and including one or more first receiving units and a second receiving unit set arranged at the second position and including one or more second receiving units; and a step of acquiring, using the distance parameter, a relationship between the strength difference and smallest and largest values of a distance from the position of the terminal device to the first position, the distance being identifiable using the positioning signal, while taking into account interference caused by multipath of the positioning signal.

In the foregoing embodiment, a step of accepting information, a step of outputting information, a step of transmitting and receiving information, and the like do not include at least processing that can only be performed by hardware, such as processing that is performed by a communication device, an interface card, or the like in the step of accepting information, for example.

Furthermore, this program may be executed by downloading from a server or the like, or may be executed by reading a program stored in a predetermined recording medium (e.g., an optical disk such as a CD-ROM, a magnetic disk, a semiconductor memory, etc.). Furthermore, the program may be used as a program for constituting a program product.

Furthermore, a computer that executes the program may be a single computer or may be multiple computers. That is to say, centralized processing may be performed, or distributed processing may be performed.

Figure 9:
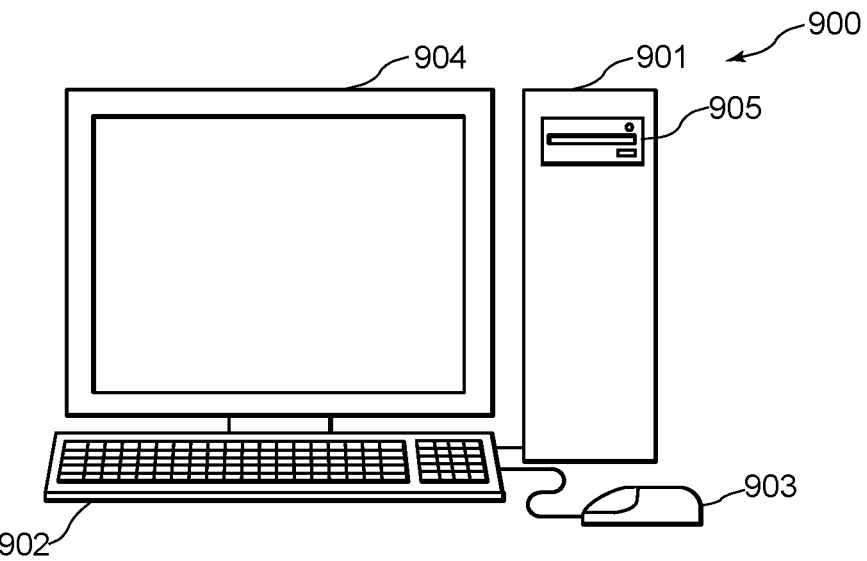
FIG. 9 is a schematic diagram showing an example of the external appearance of a computer system according to the embodiment.

FIG. 9 is a schematic diagram showing an example of the external appearance of a computer that executes the program described in this specification to realize the simulation apparatus 1 according to the foregoing embodiment. The foregoing embodiment may be realized using computer hardware and a computer program executed thereon.

In FIG. 9, a computer system 900 includes a computer 901 including a CD-ROM drive 905, a keyboard 902, a mouse 903, and a monitor 904.

Figure 10:
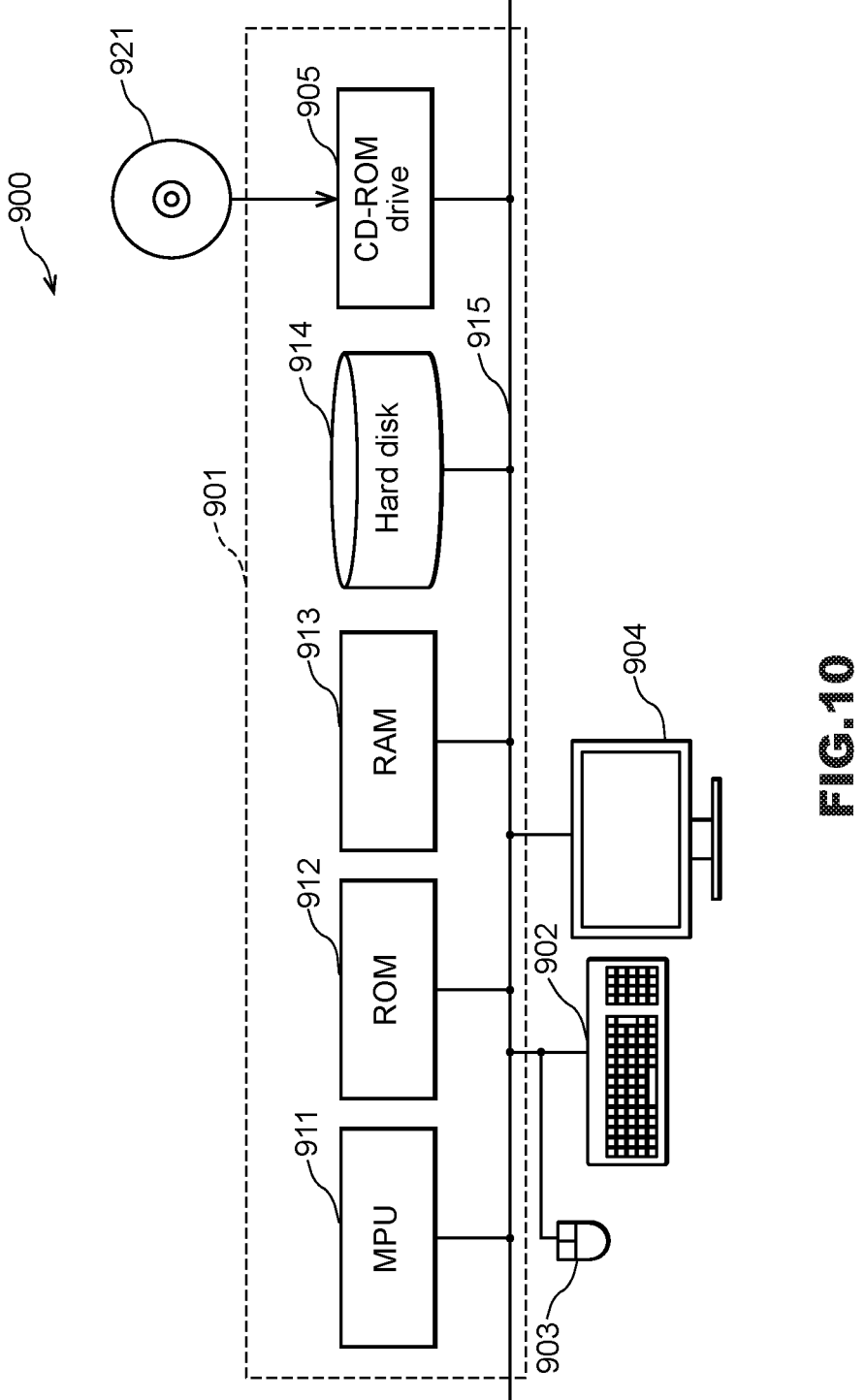
FIG. 10 is a diagram showing an example of the configuration of the computer system according to the embodiment.

FIG. 10 is a diagram showing the internal configuration of the computer system 900. In FIG. 10, the computer 901 includes, in addition to the CD-ROM drive 905, an MPU (Micro Processing Unit) 911, a ROM 912 in which a program such as a boot up program is stored, a RAM 913 that is connected to the MPU 911 and is a memory in which a command of an application program is temporarily stored and a temporary storage area is provided, a hard disk 914 in which an application program, a system program, and data are stored, and a bus 915 that connects the MPU 911, the ROM 912, and the like to each other. The computer 901 may further include a network card (not shown) that provides connection to a LAN, a WAN, and the like.

The program for causing the computer system 900 to execute the functions of the simulation apparatus 1 in the foregoing embodiment may be stored in a CD-ROM 921 that is inserted into the CD-ROM drive 905, and be transmitted to the hard disk 914. Alternatively, the program may be transmitted via a network (not shown) to the computer 901 and stored in the hard disk 914. At the time of execution, the program is loaded into the RAM 913. The program may be loaded from the CD-ROM 921 or directly from a network. The program may be read into the computer system 900 via other recording media (e.g., a DVD, etc.) instead of the CD-ROM 921.

The program does not necessarily have to include, for example, an operating system (OS) or a third party program to cause the computer 901 to execute the functions of the simulation apparatus 1 in the foregoing embodiment. The program may only include a command portion to call an appropriate function or module in a controlled mode and obtain desired results. The manner in which the computer system 900 operates is well known, and thus a detailed description thereof has been omitted.

The present invention is not limited to the embodiment set forth herein. Various modifications are possible within the scope of the present invention.

As described above, the simulation apparatus, the receiving apparatus, the simulation method, the arranging method, and the program according to an aspect of the present invention can be used, for example, to acquire a relationship between a received strength difference of a positioning signal transmitted from a terminal device for use in payment at a cash register, an automatic ticket gate, or the like, and the range in which the position of the terminal device can be identified, and to realize more accurate identification of the position of the terminal device, with a compact arrangement.

The invention claimed is:

1. A simulation method comprising:
   a step of accepting an input indicative of a distance parameter indicating a real space distance between a first position, at which a first receiving unit set including one or more first receiving units is arranged, and a second position, different from the first position, at which a second receiving unit set including one or more second receiving units is arranged, with respect to identification of a position of a terminal device whose position is to be identified based on a strength difference between a received signal strength of a positioning signal that is transmitted from the terminal device and is received the first receiving unit set and a received signal strength of the positioning signal that is received by the second receiving unit set; and a step of acquiring, using the distance parameter, a relationship between the strength difference and smallest and largest values of a distance from the position of the terminal device to the first position, the distance being identifiable using the positioning signal, while taking into account interference caused by multipath of the positioning signal.

2. The simulation method according to claim 1, further comprising a step of identifying a threshold value regarding the strength difference with which the position of the terminal device is identifiable when the distance from the position of the terminal device to the first position is equal to or shorter than a desired distance, using the acquired relationship.

3. A simulation apparatus comprising:

an accepting unit that accepts an input indicative of a distance parameter indicating a real space distance between a first position, at which a first receiving unit set including one or more first receiving units is arranged, and a second position, different from the first position, at which a second receiving unit set including one or more second receiving units is arranged, with respect to identification of a position of a terminal device whose position is to be identified based on a strength difference between a received signal strength of a positioning signal that is transmitted from the terminal device and is received by the first receiving unit set and a received signal strength of the positioning signal that is received by the second receiving unit set; and an acquiring unit that acquires, using the distance parameter, a relationship between the strength difference and smallest and largest values of a distance from the position of the terminal device to the first position, the distance being identifiable using the positioning signal, while taking into account interference caused by multipath of the positioning signal.

4. A receiving apparatus comprising:

a planar shielding member changing a propagation distance of a positioning signal transmitted from a terminal device whose position is to be identified;

a first receiving unit set arranged on the side of a first face of the planar shielding member and including one or more first receiving units that receive the positioning signal; and a second receiving unit set arranged on the side of a second face that is different from the first face of the planar shielding member and including one or more second receiving units that receive the positioning signal.

5. The receiving apparatus according to claim 4, further comprising:

a first shielding member arranged so as to surround the first receiving unit set; and a second shielding member arranged so as to surround the second receiving unit set, wherein the first and second shielding members each have an opening portion.

6. The receiving apparatus according to claim 4, wherein the first receiving unit set and the second receiving unit set are arranged at different positions in a plane direction of the planar shielding member.

7. The receiving apparatus according to claim 4, further comprising an identifying unit identifying the position of the terminal device based on a strength difference of the positioning signal received by each of the first receiving unit set and the second receiving unit set.

8. A non-transitory computer readable medium with instructions thereon that, when executed by a processor of a computer, cause the processor to execute:

a step of accepting an input indicative of a distance parameter indicating a real space distance between a first position, at which a first receiving unit set including one or more first receiving units is arranged, and a second position, different from the first position, at which a second receiving unit set including one or more second receiving units is arranged, with respect to identification of a position of a terminal device whose position is to be identified based on a strength difference between a received signal strength of a positioning signal that is transmitted from the terminal device and is received by the first receiving unit set and a received signal strength of the positioning signal that is received by the second receiving unit set; and a step of acquiring, using the distance parameter, a relationship between the strength difference and smallest and largest values of a distance from the position of the terminal device to the first position, the distance being identifiable using the positioning signal, while taking into account interference caused by multipath of the positioning signal.

* * * * *